US012126218B2

(12) United States Patent
Saijo

(10) Patent No.: US 12,126,218 B2
(45) Date of Patent: Oct. 22, 2024

(54) ROTOR FOR ROTATING ELECTRICAL MACHINE

(71) Applicant: KABUSHIKI KAISHA TOYOTA JIDOSHOKKI, Kariya (JP)

(72) Inventor: Masaki Saijo, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 371 days.

(21) Appl. No.: 17/779,023

(22) PCT Filed: Nov. 17, 2020

(86) PCT No.: PCT/JP2020/042787
§ 371 (c)(1),
(2) Date: May 23, 2022

(87) PCT Pub. No.: WO2021/106682
PCT Pub. Date: Jun. 3, 2021

(65) Prior Publication Data
US 2022/0416597 A1    Dec. 29, 2022

(30) Foreign Application Priority Data

Nov. 25, 2019    (JP) ................ 2019-212185
Nov. 25, 2019    (JP) ................ 2019-212186
Nov. 25, 2019    (JP) ................ 2019-212188

(51) Int. Cl.
*H02K 1/276*    (2022.01)
*H02K 1/16*    (2006.01)
*H02K 1/2706*    (2022.01)

(52) U.S. Cl.
CPC ............. *H02K 1/2706* (2013.01); *H02K 1/16* (2013.01); *H02K 1/2766* (2013.01)

(58) Field of Classification Search
CPC ........ H02K 1/16; H02K 1/2706; H02K 1/276; H02K 1/2766
See application file for complete search history.

(56) References Cited

U.S. PATENT DOCUMENTS

| 4,564,777 A | 1/1986 | Senoo et al. |
| 6,727,627 B1 | 4/2004 | Sasaki et al. |

(Continued)

FOREIGN PATENT DOCUMENTS

| JP | 59-201663 A | 11/1984 |
| JP | 07-312837 A | 11/1995 |

(Continued)

OTHER PUBLICATIONS

Extended European Search Report dated Dec. 14, 2022 in Application No. 20891551.2.

*Primary Examiner* — Gary A Nash
(74) *Attorney, Agent, or Firm* — Sughrue Mion, PLLC

(57) ABSTRACT

A rotor for a rotating electrical machine includes a rotor core body that includes a bridge through which a first inner surface is connected to a second inner surface of an innermost flux barrier when the rotor core body is viewed in an axial direction of a rotor core. The innermost flux barrier has an outer-side closed space that is a defined space and is formed between the bridge and an outer periphery of the rotor core body. The outer diameter closed space is filled, in the axial direction of the rotor core body, with a reinforcing part that is made of a non-magnetic material.

14 Claims, 17 Drawing Sheets

(56) References Cited

U.S. PATENT DOCUMENTS

| | | | |
|---|---|---|---|
| 10,523,099 B2 | 12/2019 | Haussmann et al. | |
| 2012/0206007 A1* | 8/2012 | Kitagawa | H02K 15/03 29/598 |
| 2015/0244215 A1* | 8/2015 | Fukasaku | H02K 1/276 310/156.53 |
| 2016/0301268 A1* | 10/2016 | Watanabe | H02K 1/2706 |
| 2016/0352164 A1* | 12/2016 | Mochida | H02K 21/14 |
| 2017/0098969 A1* | 4/2017 | Fukumoto | H02K 1/02 |

FOREIGN PATENT DOCUMENTS

| | | |
|---|---|---|
| JP | 2003-158838 A | 5/2003 |
| JP | 2011-097783 A | 5/2011 |
| JP | 2013-132124 A | 7/2013 |
| JP | 2016-507207 A | 3/2016 |
| JP | 6020629 B2 | 10/2016 |
| JP | 2016-220514 A | 12/2016 |

\* cited by examiner

ROTOR FOR ROTATING ELECTRICAL MACHINE

CROSS-REFERENCE TO RELATED APPLICATIONS

This application is a National Stage of International Application No. PCT/JP2020/042787 filed Nov. 17, 2020, claiming priority based on Japanese Patent Application No. 2019-212185 filed Nov. 25, 2019, Japanese Patent Application No. 2019-212186 filed Nov. 25, 2019, and Japanese Patent Application No. 2019-212188 filed Nov. 25, 2019, the contents of all of which are incorporated herein by reference in their entirety.

TECHNICAL FIELD

The present disclosure relates to a rotor for a rotating electrical machine.

BACKGROUND ART

Patent literature 1 mentions a known rotor for a permanent-magnet-embedded rotating electrical machine.

The rotor includes a cylindrical rotor core formed of the stack of electromagnetic steel plates disposed inward of the inner peripheral portion of the stator on which a coil winding is disposed. The rotor core is arranged such that the outer peripheral surface of the rotor core faces the inner peripheral portion of the stator. The rotor core has a plurality of permanent magnet insertion holes so as to form a plurality of layers in a radial direction, and permanent magnets are inserted into the permanent magnet insertion holes. The rotor core has a plurality of magnetic pole regions in a circumferential direction, and flux barriers are adjacent to the permanent magnet insertion holes. The flux barriers extend along the q-axis flux path. The flux barriers include a flux barrier that is located in the radially innermost portion of the rotor core and extend close to the outer peripheral portion of the rotor core.

Patent literature 2 discloses a rotor for a permanent-magnet rotating electrical machine that includes a groove or a hole that has a wedge shape, a permanent magnet disposed in the groove or hole, and a filler material. The wedge-shaped groove or hole has a taper surface that has the width gradually and outwardly decreased in the radial direction, and is formed along the axial direction of the rotor core. The filler material is filled, by die casting, into another groove or hole formed adjacent to the groove or hole in which the permanent magnet is disposed, so as to press the permanent magnet, and presses the opposite ends of the permanent magnet in the circumferential direction into a space between the permanent magnet and the rotor core.

CITATION LIST

Patent Literature

Patent Literature 1: Japanese Patent No. 6020629
Patent Literature 2: Japanese Patent Application Publication No. H07-312837

SUMMARY OF INVENTION

Technical Problem

In the rotor for the rotating electrical machine of patent literature 1, the rotor core becomes thinner as the flux barrier located in the radially innermost portion of the rotor core extends toward the outer peripheral portion of the rotor core. This decreases the strength of the rotor core. If the rotor core is thickened so as to maintain the strength of the rotor core, it is likely to increase leakage magnetic flux at the thickened portion of the rotor core.

In the rotor for the rotating electrical machine in patent literature 1, a shaft is inserted through the center of the rotor core formed of the stack of electromagnetic steel plates, and for example, the shaft and the rotor core are fixed by means, such as shrink-fitting, which may cause a warp in the electromagnetic steel plates of the rotor core when the rotational speed increases.

Similarly, in the rotor for the rotating electrical machine in patent literature 2, a shaft is inserted through the center of the rotor core formed of the stack of the electromagnetic steel plates, and for example, the shaft and the rotor core are fixed by means, such as shrink-fitting, so that generated stress may cause a bend and a warp in the electromagnetic steel plates of the rotor core. This warp may cause a decrease in a fixing force between the shaft and the rotor core. Furthermore, fast rotation of the rotor may cause further deformation of the rotor, thereby breaking the rotational balance of the rotor. Since the rotor for the rotating electrical machine rotates at high speed, there is a need for easy balancing of the rotational of the rotor.

The present disclosure has been made by focusing on the problem existing in such a conventional technique, and an object of the present disclosure is to provide a rotor for a rotating electrical machine capable of easily suppressing leakage magnetic flux and maintaining its strength.

Another object of the present disclosure is to provide a rotor for a rotating electrical machine capable of suppressing a warp in the electromagnetic steel plates of a rotor core for firm fixing of the electromagnetic steel plates and easy balancing of the rotational of the rotor.

Solution to Problem

In a rotor for a rotating electrical machine according to a first embodiment of the present disclosure to solve the above mentioned problems, the rotor comprises a rotor core having a cylindrical shape and including a rotor core body, the rotor core body having a plurality of permanent magnet insertion holes which are arranged in a radial direction of the rotor core and in which a plurality of permanent magnets are inserted, and the rotor core has: a plurality of magnetic pole regions arranged in a circumferential direction of the rotor core; and a plurality of flux barriers adjacent to the plurality of permanent magnet insertion holes and each extending along a q-axis flux path, the flux barriers extend in an axial direction of the rotor core, the flux barriers include an innermost flux barrier that is located in a radially innermost portion of the rotor core, and the innermost flux barrier has a first inner surface and a second inner surface respectively on an inner side and an outer side in the radial direction of the rotor core, the rotor core body includes a bridge through which the first inner surface is connected to the second inner surface when the rotor core body is viewed in the axial direction of the rotor core, the innermost flux barrier has an outer-side closed space that is a defined space and is formed between the bridge and an outer periphery of the rotor core body, and the outer-side closed space is filled, in the axial direction of the rotor core body, with a reinforcing part that is made of a non-magnetic material.

According to this configuration, the reinforcing part inserted in the outer-side closed space of the rotor core maintains the strength of the rotor core. Since the presence of the bridge and the reinforcing part maintains the strength of the rotor core, this configuration allows a reduction in the wall thickness of the rotor core at a position adjacent to the distal end of the innermost flux barrier and therefore facilitates suppression of the leakage magnetic flux. Accordingly, this configuration maintains the strength of the rotor core while facilitating the suppression of leakage magnetic flux.

In the rotor for the rotating electrical machine, preferably, the innermost flux barrier has an inner-side closed space that is a defined space and is formed between the bridge and the corresponding permanent magnet.

The reinforcing part may be formed such that a melted non-magnetic material is filled in the outer-side closed space of the rotor core. In this case, if the permanent magnet is held between bridges, heat of the melted non-magnetic material filled in the outer-side closed space transfers to the permanent magnet, which may decrease the performance of the permanent magnet.

In this regard, this configuration allows the inner-side closed space of the rotor core to serve as a heat insulating layer. This configuration therefore prevents heat from affecting the permanent magnet in the permanent magnet insertion hole of the rotor core.

In the rotor for the rotating electrical machine, preferably, the rotor core includes a covering member that is stacked on each of opposite ends of the rotor core body in the axial direction of the rotor core, and the covering member includes: a cover hole communicated with the outer-side closed space; and a coveting portion covering the bridge and the permanent magnets in the respective permanent magnet insertion holes located in the radially innermost portion of the rotor core, the covering portion further coveting the respective permanent magnet insertion holes located in a radially outer portion of the rotor core with respect to the permanent magnet insertion holes located in the radially innermost portion of the rotor core, and the cover hole is preferably filled with the reinforcing part.

According to this configuration, when the melted non-magnetic material is filled in the outer-side closed space of the rotor core, the covering portion of the covering member prevents the melted metal from adhering to the permanent magnets and allows the filling of the metal only into the cover hole and the outer-side closed space. This prevents heat from affecting the permanent magnets in the permanent magnet insertion holes of the rotor core.

In the rotor for the rotating electrical machine, preferably, the first inner surface has a projecting portion that projects toward an adjacent one of the magnetic pole regions from an imaginary inner surface imaginarily extended along the q-axis flux path from an inner surface of the corresponding one of the permanent magnet insertion holes, wherein the inner surface of the permanent magnet insertion hole of the permanent magnet insertion hole is located radially inner side of the permanent magnet insertion hole and with which the permanent magnet comes in contact.

This configuration allows the spread of the innermost flux barrier in the d-axis flux path to increase reluctance torque.

In the rotor for the rotating electrical machine, preferably, the rotor core body is formed of a plurality of electromagnetic steel plates stacked on top of each other along the axial direction of the rotor core, the rotor core includes holding parts that hold the rotor core body therebetween in the axial direction of the rotor core, and the holding parts are formed integrally with the reinforcing part.

This configuration allows the plurality of electromagnetic steel plates to be fixed by the holding parts formed integrally with the reinforcing part so that the electromagnetic steel plates are not separated from each other in the axial direction of the rotor core. This configuration therefore enables the plurality of electromagnetic steel plates to be appropriately fixed without using a fixing member, such as a screw.

In a rotor for a rotating electrical machine according to a second embodiment of the present disclosure to solve the above mentioned problems, the rotor comprises a cylindrical rotor core that has an outer peripheral surface facing an inner peripheral portion of a stator around which a coil is wound, and a shaft is inserted through a center of the rotor core that is formed of a plurality of electromagnetic steel plates stacked on top of each other, the rotor core has a permanent magnet insertion hole that extends in an axial direction of the rotor core and is formed in each of magnetic poles, a permanent magnet is inserted in the permanent magnet insertion hole, and the rotor core has a fill hole that extends in the axial direction of the rotor core and is formed between the adjacent magnetic poles or in each of the magnetic poles, and the rotor core is formed of the electromagnetic steel plates fixed to each other by non-magnetic metal or resin filled in the fill hole.

In the rotor for the rotating electrical machine, the permanent magnet insertion hole includes an outer-side permanent magnet insertion hole located in a radially outer portion of the rotor core and an inner-side permanent magnet insertion hole located in a radially inner portion of the rotor core with respect to the outer-side permanent magnet insertion hole, the permanent magnet includes an outer-side permanent magnet inserted into the outer-side permanent magnet insertion hole and an inner-side permanent magnet inserted into the inner-side permanent magnet insertion hole, flux barriers are formed adjacent to opposite ends of the inner-side permanent magnet insertion hole of the rotor core in a circumferential direction of the rotor core, and continuously with the opposite ends of the inner-side permanent magnet insertion hole, and the fill hole is formed in a region between the flux barriers respectively in the adjacent magnetic poles.

According to this configuration, the fill hole extends in the axial direction of the rotor core and is formed in a region between the flux barriers respectively in the adjacent magnetic poles in the rotor core, and the electromagnetic steel plates are fixed by the non-magnetic metal or resin filled in the fill hole. This configuration enables firm fixing of the electromagnetic steel plates of the rotor core and suppression of a warp in the electromagnetic steel plates of the rotor core.

In the rotor for the rotating electrical machine, preferably, the outer-side permanent magnet insertion hole and the inner-side permanent magnet insertion hole in each magnetic pole have an arc shape.

It is particularly useful when the outer-side permanent magnet insertion hole and the inner-side permanent magnet insertion hole have an arc shape.

In the rotor for the rotating electrical machine, preferably, the rotor core further has another fill hole that extends in the axial direction of the rotor core and is located away from the flux barriers in the circumferential direction of the rotor core, and the rotor core is formed of the electromagnetic steel plates fixed to each other by non-magnetic metal or resin filled in the another fill hole.

This configuration enables more firm fixing of the electromagnetic steel plates of the rotor core, thereby further suppressing a warp in the electromagnetic steel plates of the rotor core.

In the rotor for the rotating electrical machine according to the second embodiment of the present disclosure, preferably, the rotor core includes holding parts made of the non-magnetic metal or resin and formed integrally with axially opposite end faces of the rotor core, respectively, each of the holding parts has: a thick wall portion that is connected to a bar made of the non-magnetic metal or resin filled in the fill hole; and a thin wall portion that is arranged at multiple positions in a circumferential direction of the rotor core, and a pin for rotational balancing is formed integrally with the thin wall portion such that the pin protrudes outwardly from the thin wall portion in the axial direction of the rotor core.

According to this configuration, the electromagnetic steel plates are fixed by the non-magnetic metal or resin filled in the fill hole that extends in the axial direction and is formed between the adjacent magnetic poles or in each of the magnetic poles in the rotor core. The thick wall portion of each of the holding parts is made of non-magnetic metal or resin and connected to the bar made of the non-magnetic metal or resin filled in the fill hole, so that the connection strength of the bar made of the non-magnetic metal or resin is enhanced and the electromagnetic steel plates of the rotor core are therefore firmly fixed. The pin for rotational balancing is formed integrally with each of the thin wall portions of the holding parts such that the pin protrudes therefrom outwardly in the axial direction, so that rotational balancing is facilitated by using the pin.

In the rotor for the rotating electrical machine, preferably, the electromagnetic steel plates of the rotor core each have the permanent magnet insertion hole and the fill hole, and a covering member having the fill hole only is disposed between the holding parts and the electromagnetic steel plates.

This configuration prevents the non-magnetic metal or resin filled in the fill hole from flowing into the permanent magnet insertion hole.

In the rotor for the rotating electrical machine, preferably, the permanent magnet insertion hole includes an outer-side permanent magnet insertion hole that extends in the axial direction of the rotor core and is located in a radially outer portion of the rotor core and an inner-side permanent magnet insertion hole that extends in the axial direction of the rotor core and is located in a radially inner portion of the rotor core with respect to the outer-side permanent magnet insertion hole, an outer-side permanent magnet and an inner-side permanent magnet are respectively inserted into the outer-side permanent magnet insertion hole and the inner-side permanent magnet insertion hole, flux barriers are formed adjacent to opposite ends of the inner-side permanent magnet insertion hole of the rotor core in the circumferential direction of the rotor core and continuously with the opposite ends of the inner-side permanent magnet insertion hole, and the fill hole is formed in a region between the flux barriers respectively in the adjacent magnetic poles of the rotor core, and extends in the axial direction of the rotor core.

In the rotor for the rotating electrical machine, preferably, the outer-side permanent magnet insertion hole and the inner-side permanent magnet insertion hole in each magnetic pole have an arc shape.

It is particularly useful when the outer-side permanent magnet insertion hole and the inner-side permanent magnet insertion hole have an arc shape.

In the rotor for the rotating electrical machine, preferably, the rotor core further has another fill hole that extends in the axial direction of the rotor core and is located away from the flux barriers in the circumferential direction of the rotor core, and the rotor core is formed of the electromagnetic steel plates fixed to each other by non-magnetic metal or resin filled in the another fill hole.

This configuration enables more firm fixing of the electromagnetic steel plates of the rotor core.

Advantageous Effects of Invention

This disclosure facilitates suppression of leakage magnetic flux while maintaining the strength of the rotor. Furthermore, this disclosures enables suppression of a warp in electromagnetic steel plates of a rotor core for firm fixing and easy balancing of the rotation of the rotor.

DESCRIPTION OF EMBODIMENTS

First Embodiment

The following will describe a first embodiment of a rotor core with reference to FIGS. 1-5. Before explaining the rotor core of this embodiment, the following will describe a configuration of a rotating electrical machine equipped with the rotor core of this embodiment.

Figure 1:
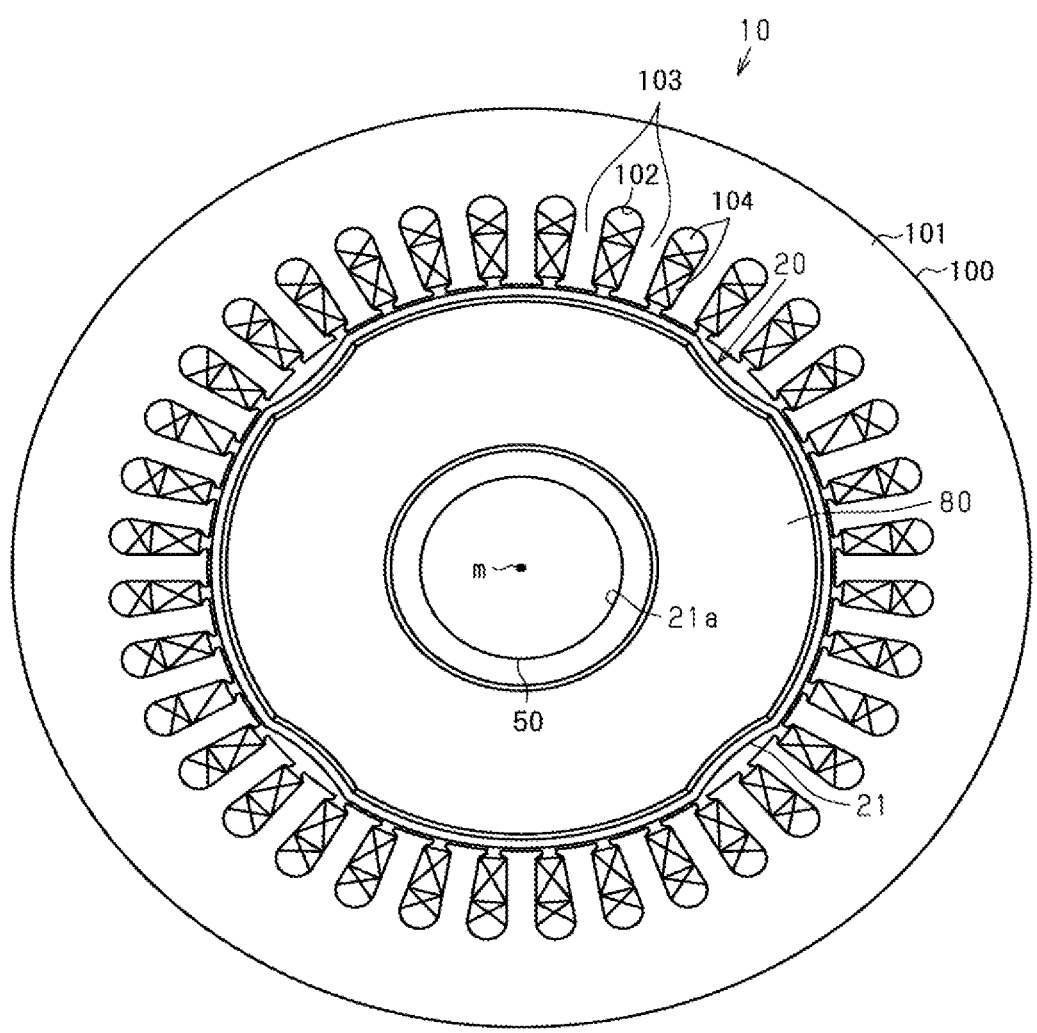
FIG. 1 is a schematic view of a rotating electrical machine according to a first embodiment.

As illustrated in FIG. 1, a rotating electrical machine 10 is a permanent-magnet-embedded synchronous motor. The rotating electrical machine 10 includes a rotor 20 and a stator 100. The stator 100 surrounds the outer periphery of the rotor 20. The inner peripheral surface of the stator 100 faces the outer peripheral surface of the rotor 20 with a gap therebetween. All the drawings are schematic to exaggerate the geometry. The rotating electrical machine 10 includes four poles, and permanent magnets are separated from each other by 90 degrees in a circumferential direction.

The stator 100 includes a stator core 101. The stator core 101 has a cylindrical shape. The stator core 101 has a plurality of slots 102 formed in the inner peripheral portion of the stator core 101 and arranged in the circumferential direction. The slots 102 are opened on the inner peripheral surface of the stator core 101. A tooth of teeth 103 is formed between the adjacent slots 102. The teeth 103 are wrapped with a coil (winding wire) 104. That is, the stator 100 has windings of the coil 104 such that teeth 103 around which the coil 104 is wound are arranged in the circumferential direction on the inner peripheral side of the stator 100. The rotor 20 cooperates with the inner peripheral surface of the stator core 101 to form a gap therebetween. The rotor 20 is disposed such that the outer peripheral surface of a rotor core 21 faces the inner peripheral portion of the stator 100 with the gap therebetween.

Figure 2:
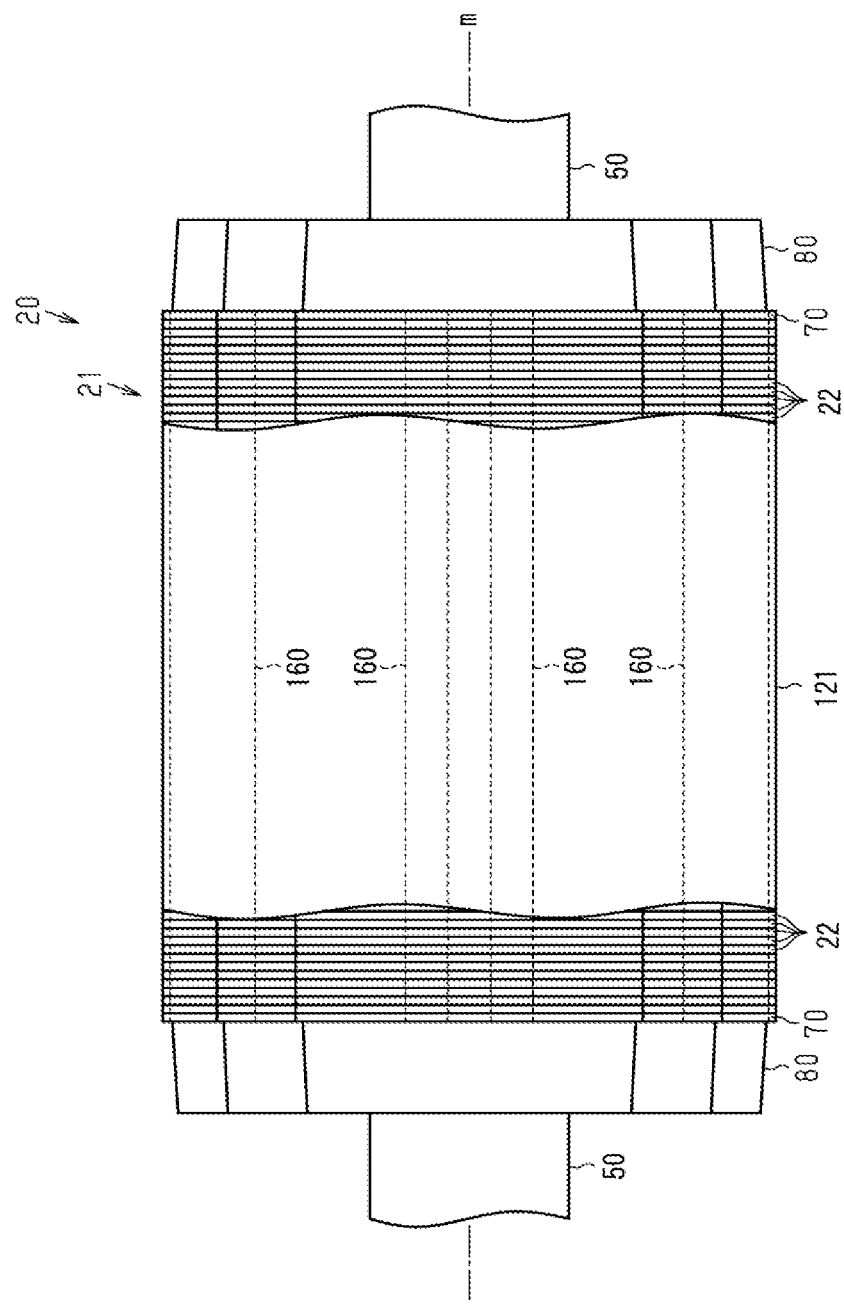
FIG. 2 is a schematic view of a rotor for the rotating electrical machine according to the first embodiment.

As illustrated in FIGS. 1, 2, the rotor 20 includes the cylindrical rotor core 21 and a shaft 50. The rotor 20 is rotatably supported by a bearing of a housing (not illustrated), via the shaft 50, with a predetermined spacing between the outer peripheral surface of the rotor core 21 and the teeth 103. The shaft 50 is inserted through a through hole 21a that is formed through the center of the rotor core 21, and is shrink-fitted in the rotor core 21.

As illustrated in FIG. 2, the rotor core 21 includes a rotor core body 121. The rotor core body 121 is formed of a plurality of electromagnetic steel plates 22 (e.g., dozens of plates) having a substantially disc shape and stacked on top of each other along the axial direction of the axis m of the rotor core 21. In the rotor core body 121 illustrated in FIG. 2, the stacked shape of the electromagnetic steel plates 22 is partially omitted.

Figure 3:
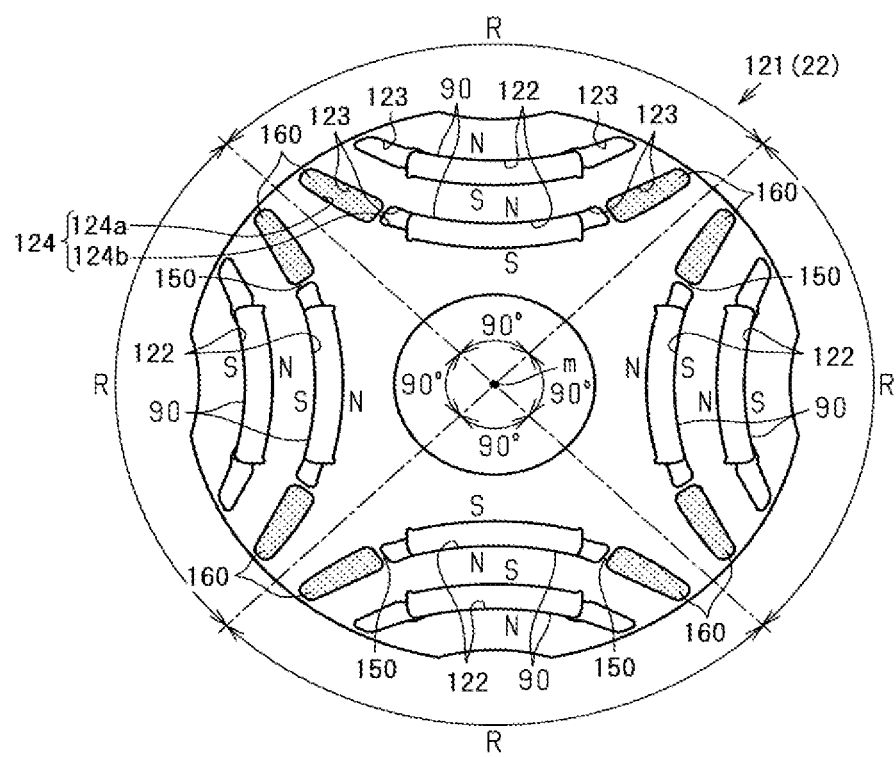
FIG. 3 is a top view of electromagnetic steel plates of a rotor core according to the first embodiment.

The following will describe the configuration of the rotor core body 121 with reference to FIG. 3 in detail. FIG. 3 illustrates the configuration of the electromagnetic steel plates 22, and each of the electromagnetic steel plates 22 has the same configuration. Since this allows the configuration of the electromagnetic steel plates 22 to be regarded as the same configuration of the rotor core body 121, the following will describe the configuration of the rotor core body 121 with reference to FIG. 3.

As illustrated in FIG. 3, the rotor core body 121 includes four magnetic pole regions R arranged in a circumferential direction of the rotor core body 121 respectively and corresponding to the poles of the rotating electrical machine 10, when the rotor core body 121 is viewed in the axial direction of the rotor core 21. Each of the four magnetic pole regions R has the center angle of 90 degrees with respect to the axis m of the rotor core 21. The rotor core body 121 has, in the four magnetic pole regions R, a plurality of permanent magnet insertion holes 122 radially formed with respect to the axis m of the rotor core 21. In the first embodiment, the rotor core body 121 has the permanent magnet insertion holes 122 respectively on the radially inner side and outer side of each of the four magnetic pole regions R such that the permanent magnet insertion holes 122 form two layers in the rotor core body 121. The permanent magnet insertion holes 122 are axially formed through the rotor core body 121. That is, the permanent magnet insertion holes 122 are formed through all the electromagnetic steel plates 22 and axially communicated with each other. Each of the permanent magnet insertion holes 122 has an arc shape such that the permanent magnet insertion hole 122 extends toward the adjacent magnetic pole regions R and away from the axis m of the rotor core 21. Each of the permanent magnet insertion holes 122 has an arc shape projecting toward the center of the rotor core 21 (an arc shape that has a center on the outer diameter of the rotor core 21). A permanent magnet 90 is inserted into each permanent magnet insertion hole 122 of the rotor core body 121. The permanent magnet 90 has an arc shape corresponding to the shape of the permanent magnet insertion hole 122. The permanent magnet 90 is inserted into the permanent magnet insertion hole 122 such that adjacent ones of the magnetic pole regions R have different polarities in the radially outer portion of the rotor core 21. For example, when the permanent magnet 90 is inserted into the permanent magnet insertion hole 122 in one of the four magnetic pole regions R such that the one of the magnetic pole regions R has the south pole in the radially outer portion of the rotor core 21, another permanent magnet 90 is inserted into the permanent magnet insertion hole 122 in its adjacent magnetic pole region R such that the adjacent magnetic pole region R has the north pole in the radially outer portion of the rotor core 21. Accordingly, adjacent ones of the four magnetic pole regions R have different polarities in the radially outer portion of the rotor core body 121.

Figure 5:
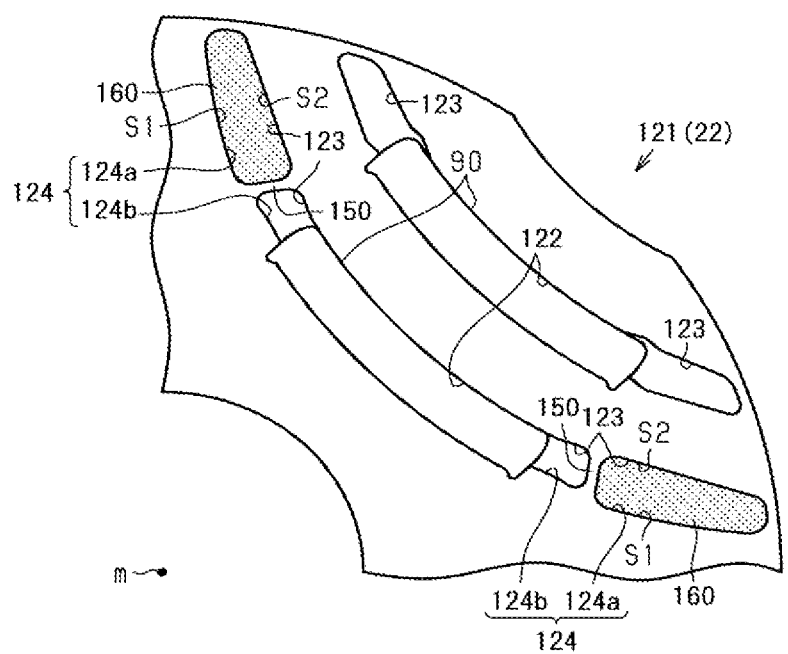
FIG. 5 is a partial top view of the electromagnetic steel plates of the rotor core according to the first embodiment.
Figure 6:
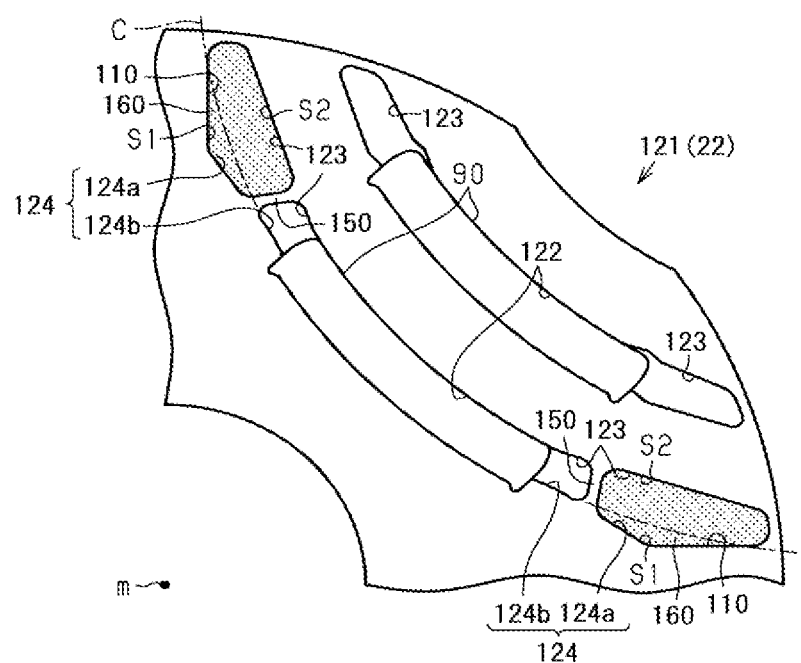
FIG. 6 is a partial top view of the electromagnetic steel plates of the rotor core according to a modification of the first embodiment.

As illustrated in FIG. 5, a flux barrier 123 is formed at each of the opposite ends of each permanent magnet insertion hole 122 of the rotor core body 121. The flux barrier 123 is adjacent to the permanent magnet insertion hole 122 and extends along the q-axis flux path. As illustrated in FIG. 6, the q-axis flux of the permanent magnet 90 extends along the curved direction of the permanent magnet 90.

The flux barrier 123 extends axially. The flux barrier 123 is axially formed through the rotor core body 121. The flux barriers 123 include innermost flux barriers 124 located in the radially innermost portion of the rotor core 21. Each of the innermost flux barriers 124 has an arc shape that extends away from the axis m of the rotor core 21 when the rotor core body 121 is viewed in the axial direction of the rotor core 21. Each of the innermost flux barriers 124 extends close to the outer peripheral portion of the rotor core 21.

Each innermost flux barrier 124 has a first inner surface S1 and a second inner surface S2 respectively on the inner side and outer side in the radial direction of the rotor core 21. The first inner surface S1 is a part of the inner surface of the innermost flux barrier 124 adjacent to the axis m of the rotor core 21. The second inner surface S2 is a part of the inner surface of the innermost flux barrier 124 distant from the axis m of the rotor core 21. The rotor core body 121 includes a bridge 150 through which the first inner surface S1 is connected to the second inner surface S2. The bridge 150 is formed over the entire length of the rotor core body 121 in the axial direction. That is, the bridge 150 is configured such that the bridge 150 formed on each of all the electromagnetic steel plates 22 is stacked on top of another in the axial direction. The bridge 150 is made of the same material as the material of the electromagnetic steel plates 22. If the bridge 150 is located too close to the permanent magnet 90 or if the bridge 150 is too large in width, the flux of the permanent magnet 90 may leak from the bridge 150, which may cause a reduction in the flux effective for torque when the rotor core 21 is used in the rotating electrical machine 10. Accordingly, the position and the width of the bridge 150 are determined in advance at designing of the rotor core 21 so as not to cause a reduction in the flux effective for the torque of the permanent magnet 90.

Each innermost flux barrier 124 has an outer-side closed space 124a that is a defined space and is formed between the bridge 150 and the outer periphery of the rotor core body 121. Similar to the flux barrier 123, the outer-side closed space 124a is axially formed through the rotor core body 121. Each innermost flux barrier 124 has an inner-side closed space 124b that is a defined space and is formed between the bridge 150 and the permanent magnet 90. Similar to the flux barrier 123, the inner-side closed space 124b is axially formed through the rotor core body 121.

The outer-side closed space 124a is filled with a reinforcing part 160 that is made of metal that serves as a non-magnetic material. The reinforcing part 160 is formed over the entire length of the rotor core body 121 in the axial direction. The reinforcing part 160 is made of aluminum.

As illustrated in FIG. 2, the rotor core 21 includes a covering member 70 that is stacked on the rotor core body 121 in the axial direction of the rotor core 21. The covering member 70 is stacked on each of opposite ends of the rotor core body 121 in the axial direction. The covering member 70 is disposed at axially opposite ends of the stack of the electromagnetic steel plates 22. The covering member 70 is made of an electromagnetic steel plate.

Figure 4:
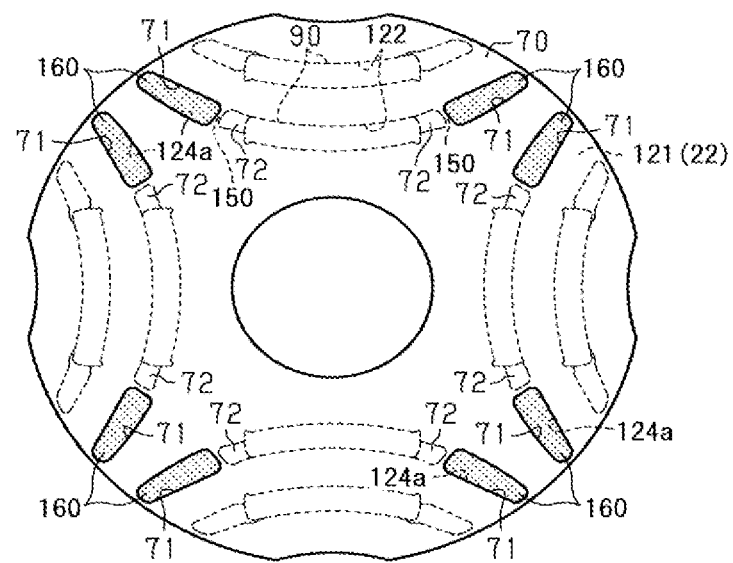
FIG. 4 is a top view of a covering member of the rotor core according to the first embodiment.

As illustrated in FIG. 4, the covering member 70 has the same shape as the shape of each electromagnetic steel plate 22. The covering member 70 has cover holes 71 and a covering portion 72. Each of the cover holes 71 has the same shape as the shape of the outer-side closed space 124a. Each cover hole 71 is located at the same position as the position of the outer-side closed space 124a of the rotor core body 121 in the axial direction, and is formed through the covering member 70. That is, the cover hole 71 is communicated with the outer-side closed space 124a with the covering member 70 stacked on the rotor core body 121. The reinforcing part 160 in the outer-side closed space 124a is inserted into the cover hole 71. The covering portion 72 covers the bridges 150 and the permanent magnets 90 in the respective permanent magnet insertion holes 122 located in the radially innermost portion of the rotor core 21 with the covering member 70 stacked on the rotor core body 121. The covering portion 72 further covers the respective permanent magnet insertion holes 122 located in the radially outer portion of the rotor core 21 with respect to the permanent magnet insertion hole 122 located in the radially innermost portion of the rotor core 21. The coveting portion 72 is a plate-like portion of the coveting member 70 except for the cover holes 71 and a hole through which the shaft 50 is inserted. That is, the covering member 70 does not have any holes at positions corresponding to the permanent magnet insertion holes 122 located in the radially outer portion of the rotor core 21 with respect to the permanent magnet insertion holes 122 located in the radially innermost portion of the rotor core 21, the permanent magnets 90 in the permanent magnet insertion holes 122 in the radially innermost portion of the rotor core 21, the inner-side closed spaces 124b, and the bridges 150, but has the cover holes 71 at positions corresponding to the outer-side closed spaces 124a.

As illustrated in FIG. 2, the rotor core 21 includes holding parts 80 that hold the rotor core body 121 therebetween in the axial direction of the rotor core 21. The holding parts 80 hold therebetween the rotor core body 121 and the covering members 70 in the axial direction. The holding parts 80 are provided integrally with the reinforcing parts 160 (indicated by the dashed line in FIG. 2). That is, the holding parts 80 are made of aluminum and provided integrally with the reinforcing parts 160 so as to prevent separation of the electromagnetic steel plates of the rotor core body 121 and the covering members 70 in the axial direction.

The rotor core 21 according to the first embodiment is formed by aluminum die casting. The following will describe a method of forming the rotor core 21.

To form an assembly, the covering members 70 are stacked respectively on the opposite ends of the rotor core body 121 in the axial direction with the permanent magnets 90 inserted into the permanent magnet insertion holes 122 of the rotor core body 121. Molten aluminum is filled into a die in which the assembly is placed. The cover holes 71 of the covering member 70 and the outer-side closed spaces 124a of the rotor core body 121 are filled with the aluminum filled into the die. The die has an inner space for forming the holding parts 80 of the rotor core 21. The sufficiently cooled aluminum in the die is removed from the die, so that the holding parts 80 provided integrally with the reinforcing parts 160 are formed while the reinforcing parts 160 are formed in the cover holes 71 of the covering member 70 and the outer-side closed spaces 124a of the rotor core body 121 of the assembly. The rotor core 21 is formed in such a manner.

The following will describe technical functions of the first embodiment.

The electromagnetic steel plates 22 of the rotor core 21 each have a slight waviness when more appropriate, so that the electromagnetic steel plates 22 are likely to bend outwardly when the shaft 50 is fitted into the rotor core 21 by press-fitting. If this rotor core 21 in the rotating electrical machine 10 is rotated, a centrifugal force is generated in the rotor core 21. This generates a bending stress in a thin wall portion of the rotor core 21 between the distal end of each innermost flux barrier 124 and the outer periphery of the rotor core 21, thereby generates a deformation force that peels the electromagnetic steel plates 22 of the rotor core 21. However, the rotor core 21 includes the bridges 150 and the reinforcing parts 160 filled in the outer-side closed spaces 124a and the cover holes 71 of the covering member 70 to release a bending stress generated in the thin wall portion of the rotor core 21. Additionally, the electromagnetic steel plates 22 and the covering members 70 are axially held between the holding parts 80 formed by aluminum die casting, so that the electromagnetic steel plates 22 and the covering members 70 are rarely peeled from each other. The bridges 150 and the reinforcing parts 160 maintain the strength of the rotor core 21, and the holding parts 80 provided integrally with the reinforcing parts 160 enhance the strength of the rotor core 21.

The following will describe advantageous effects of the first embodiment.

(1) According to the first embodiment, the reinforcing parts 160 filled in the outer-side closed spaces 124a of the rotor core 21 maintain the strength of the rotor core 21. The presence of the bridges 150 and the reinforcing parts 160 maintain the strength of the rotor core 21, which allows a reduction in the wall thickness of the rotor core 21 at the position adjacent to the distal end of the innermost flux barrier 124 and therefore facilitates suppression of the leakage magnetic flux. Accordingly, this configuration maintains the strength of the rotor core 21 while facilitating the suppression of leakage magnetic flux.

(2) According to the first embodiment, each of the inner-side closed spaces 124b of the rotor core 21 serves as a heat insulating layer. This configuration prevents heat from affecting the permanent magnet 90 in the permanent magnet insertion hole 122 of the rotor core 21 even if melted aluminum is filled into the outer-side closed space 124a of the rotor core body 121.

(3) According to the first embodiment, when the melted aluminum is filled into the outer-side closed space 124a of the rotor core 21, the covering portion 72 of the covering member 70 prevents the melted aluminum from adhering to the permanent magnet 90 and allows the filling of the aluminum only into the cover hole 71 and the outer-side closed space 124a. This prevents heat from affecting the permanent magnet 90 in the permanent magnet insertion hole 122 of the rotor core 21.

(4) According to the first embodiment, the plurality of electromagnetic steel plates 22 are fixed by the holding parts 80 formed integrally with the reinforcing parts 160 so that the electromagnetic steel plates 22 are not separated from each other in the axial direction. This configuration enables the plurality of electromagnetic steel plates 22 to be appropriately fixed without using a fixing member, such as a screw.

(5) According to the first embodiment, the reinforcing parts 160 are made of aluminum. Since the aluminum is light metal, a centrifugal force generated in the reinforcing parts 160 by the rotation of the rotor core 21 is reduced. This configuration further facilitates the maintenance of the strength of the rotor core 21.

(6) The shaft 50 is shrink-fitted in the through hole 21a of the rotor core 21. The shrink-fit of the shaft 50 in the rotor core 21 generates a fitting force in the electromagnetic steel plates 22 and the covering member 70 and therefore may cause a bend and a warp, like a peel, in the electromagnetic steel plates 22 and the coveting member 70 in the axial direction.

In this regard, according to the first embodiment, the presence of the reinforcing parts 160 reduces a deformation force generated in the whole of the electromagnetic steel plates 22 and the covering member 70. Accordingly, the deformation of the electromagnetic steel plates 22 and the coveting member 70 may be reduced.

(7) The presence of the bridges 150 of the rotor core body 121 improves the balance of the strength of the rotor core 21 in the cross section perpendicular to the axis m of the rotor core 21. That is, this configuration improves the strength of the rotor core 21 against an external force to which the rotor core 21 is subjected in the radial direction.

(8) Each bridge 150 improves the balance of the strength of the rotor core 21 even if the permanent magnet 90 inserted in the permanent magnet insertion hole 122 located in the radially outermost portion of the rotor core 21 is different in size from that in the permanent magnet insertion hole 122 located in the radially innermost portion of the rotor core 21.

(9) According to the first embodiment, the covering member 70 is made of an electromagnetic steel plate. This configuration allows the covering member 70 to be produced by a partially-modified machining process of the electromagnetic steel plates 22 that constitute the rotor core body 121. This configuration therefore allows a reduction in the manufacturing cost of the rotor core 21.

(10) According to the first embodiment, the reinforcing parts 160 and the holding parts 80 are formed by aluminum die casting. This enables the plurality of electromagnetic steel plates 22 to be appropriately fixed without using a fixing member, such as a screw, thereby allowing a reduction in the manufacturing cost of the rotor core 21.

The first embodiment can be modified and implemented as follows. The first embodiment and the following modifications can be implemented in combination with each other within a technically consistent range.

The innermost flux barriers 124 according to the first embodiment may be modified in following manners.

Figure 7:
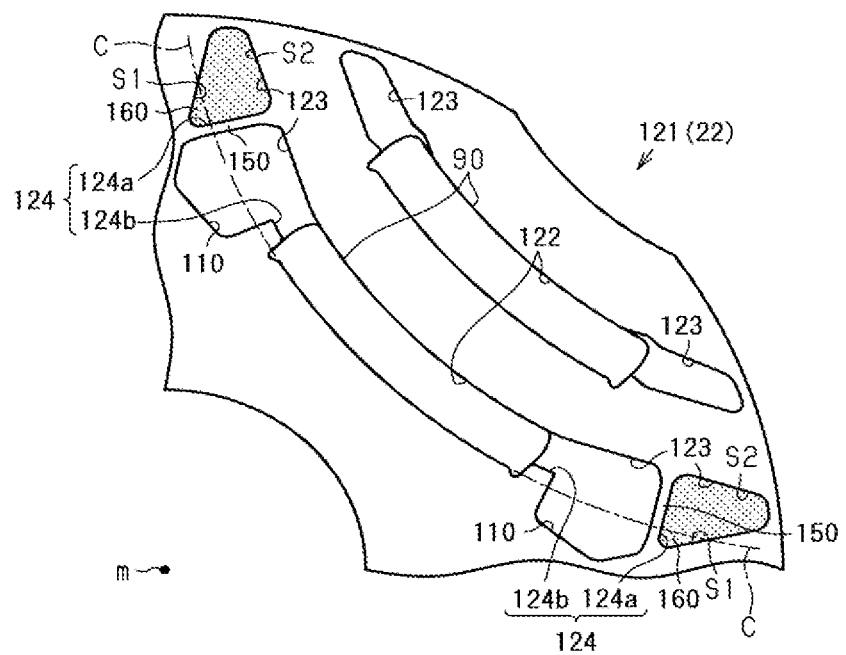
FIG. 7 is a partial top view of the electromagnetic steel plates of the rotor core according to a modification of the first embodiment.

As illustrated in FIGS. 6, 7, the first inner surface S1 may have a projecting portion 110 that projects toward its adjacent magnetic pole region R from an imaginary inner surface C imaginarily extended along the q-axis flux path (indicated by a chain line in FIG. 6) from the inner surface of the permanent magnet insertion hole 122 which is located radially inner side of the permanent magnet insertion hole 122 and with which the permanent magnet 90 comes in contact. That is, the first inner surface S1 may spread toward the adjacent magnetic pole region R beyond the q-axis flux path. For more details on FIG. 6, the first inner surface S1 of the outer-side closed space 124a spreads toward the adjacent magnetic pole region R beyond the q-axis flux path. Specifically, the projecting portion 110 is formed on the inner surface of the outer-side closed space 124a of the innermost flux barrier 124 located on the inner side in the radial direction. For more details on FIG. 7, the projecting portion 110 is formed on the inner surface of the inner-side closed space 124b of the innermost flux barrier 124 located on the inner side in the radial direction. In both of the modifications in FIGS. 6, 7, the projecting portion 110 protrudes at an amount so as to secure the width of a flux path between the adjacent magnetic pole regions R.

Such modifications allow the spread of each innermost flux barrier 124 in the d-axis flux path, and prevents the d-axis magnetic flux. This reduces d-axis inductance and increases reluctance torque. Furthermore, this reduces the flux of the permanent magnet 90. This therefore appropriately transmits the flux effective for the torque of the permanent magnet 90 to the stator 100 located outward of the rotor core 21. Therefore, this enhances the performance of the rotating electrical machine 10. The projecting portion 110 according to such modifications may be formed on the inner surface of the outer-side closed space 124a of the innermost flux barrier 124 located on the inner side in the radial direction.

The flux barrier 123 is not necessarily formed through the rotor core body 121 in the axial direction.

The reinforcing parts 160 are formed over the entire length of the rotor core body 121 in the axial direction, but may be formed through the outer-side closed space 124a over a part of the length of the rotor core body 121.

The reinforcing parts 160 are not necessarily made of aluminum. For example, the reinforcing parts 160 may be made of brass. That is, the reinforcing parts 160 are preferably made of non-magnetic metal. Alternatively, the reinforcing parts 160 may be made of resin.

According to the first embodiment, the holding parts 80 may be omitted. Even if this modification is made, aluminum constituting the reinforcing parts 160 enters a gap between the adjacent electromagnetic steel plates 22 and/or between the covering member 70 and its adjacent electromagnetic steel plate 22 so as to prevent the separation of the electromagnetic steel plates 22 and the covering members 70 from each other in the axial direction.

The rotor core body 121 according to the first embodiment is formed of the plurality of electromagnetic steel plates 22, but is not necessarily formed of the plurality of electromagnetic steel plates 22. For example, the rotor core body 121 may be formed of a single cylindrical member. Alternatively, the rotor core body 121 may be formed of a single electromagnetic steel plate 22. If the rotor core body 121 is modified in such a manner, the thickness of the electromagnetic steel plate 22 is preferably increased so that the permanent magnet 90 is inserted in the single electromagnetic steel plate 22.

Although the reinforcing parts 160 according to the first embodiment and the modifications are made of non-magnetic metal, the reinforcing parts 160 are necessarily made of a non-magnetic material, but may be made of any non-magnetic material as long as the strength of the rotor core 21 can be improved.

- Each of the cover holes 71 does not necessarily have the same shape as the shape of the outer-side closed space 124a.
- The rotor core 21 may be formed of the rotor core body 121 and the reinforcing parts 160 without the covering members 70.
- Each of the innermost flux barriers 124 may be formed of the outer-side closed space 124a without the inner-side closed space 124b. If this modification is made, the permanent magnets 90 to be inserted in the permanent magnet insertion holes 122 are preferably formed of a material that is unlikely affected by heat.
- The permanent magnet insertion holes 122 are formed so as to form two layers in the radial direction of the rotor core 21, but the permanent magnet insertion holes 122 are not limited thereto. For example, the permanent magnet insertion holes 122 may be formed so as to form three or more layers.
- The rotating electrical machine 10 has four poles, but not limited thereto. The number of poles may be modified, as necessary. If such a modification is made, the number of the magnetic pole regions R of the rotor core 21 is preferably modified along with the change in the number of poles.

Second Embodiment

The following will describe a second embodiment of the present disclosure with reference to the drawings.

Figure 8:
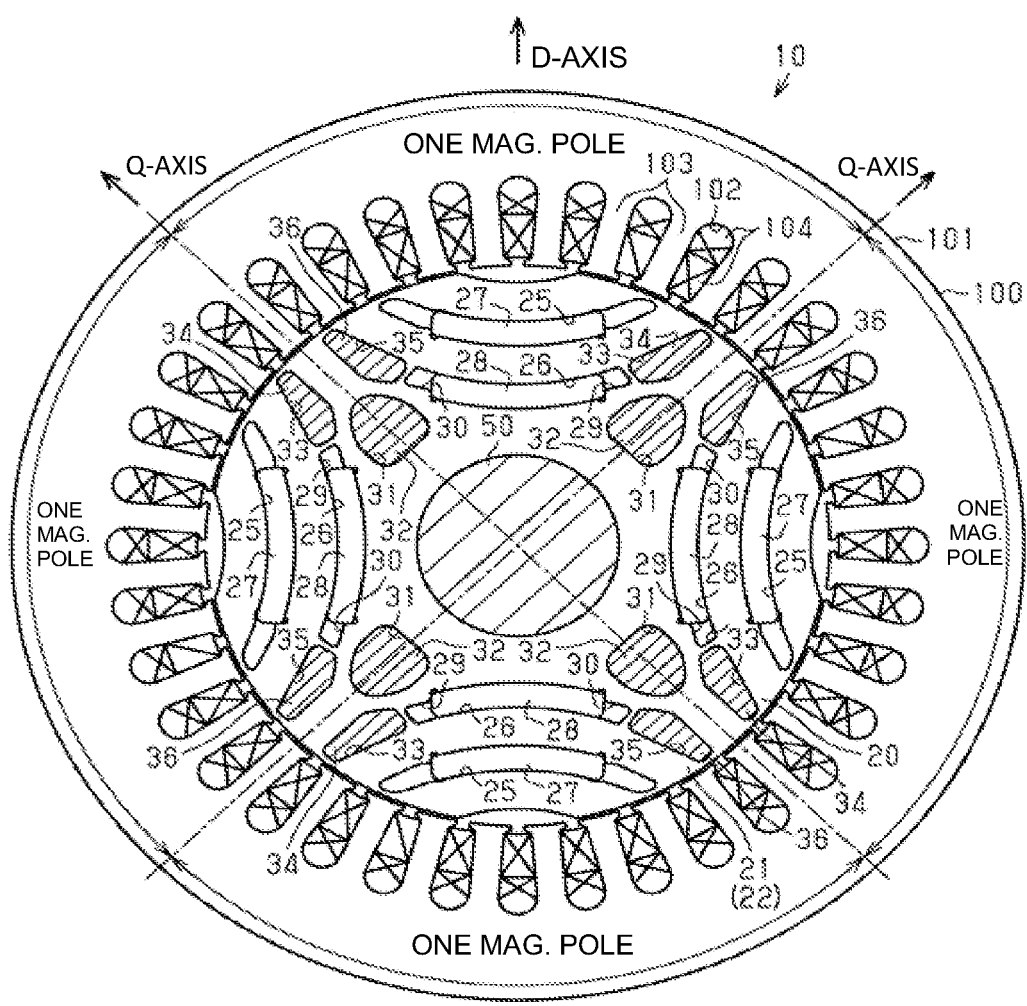
FIG. 8 is a schematic view of a rotating electrical machine according to a second embodiment.

As illustrated in FIG. 8, the rotating electrical machine 10 is a permanent-magnet-embedded synchronous motor and includes the rotor 20 and the stator 100. The stator 100 is disposed radially outward of the cylindrical rotor 20. The inner peripheral surface of the stator 100 faces the outer peripheral surface of the rotor 20 with a gap therebetween. All the drawings are schematic to exaggerate the geometry. The rotating electrical machine 10 includes four poles, and permanent magnets are separated from each other by 90 degrees in a circumferential direction.

As illustrated in FIG. 8, the stator 100 includes the cylindrical stator core 101, and the stator core 101 has the plurality of slots 102 formed in the inner peripheral portion of the stator core 101 and arranged in the circumferential direction. The slots 102 are opened on the inner peripheral surface of the stator core 101. The tooth of the teeth 103 is formed between the adjacent slots 102. The teeth 103 are wrapped with the coil (winding wire) 104. That is, the stator 100 has windings of the coil 104 such that teeth 103 around which the coil 104 is wound are arranged in the circumferential direction on the inner peripheral side of the stator 100.

Figure 9:
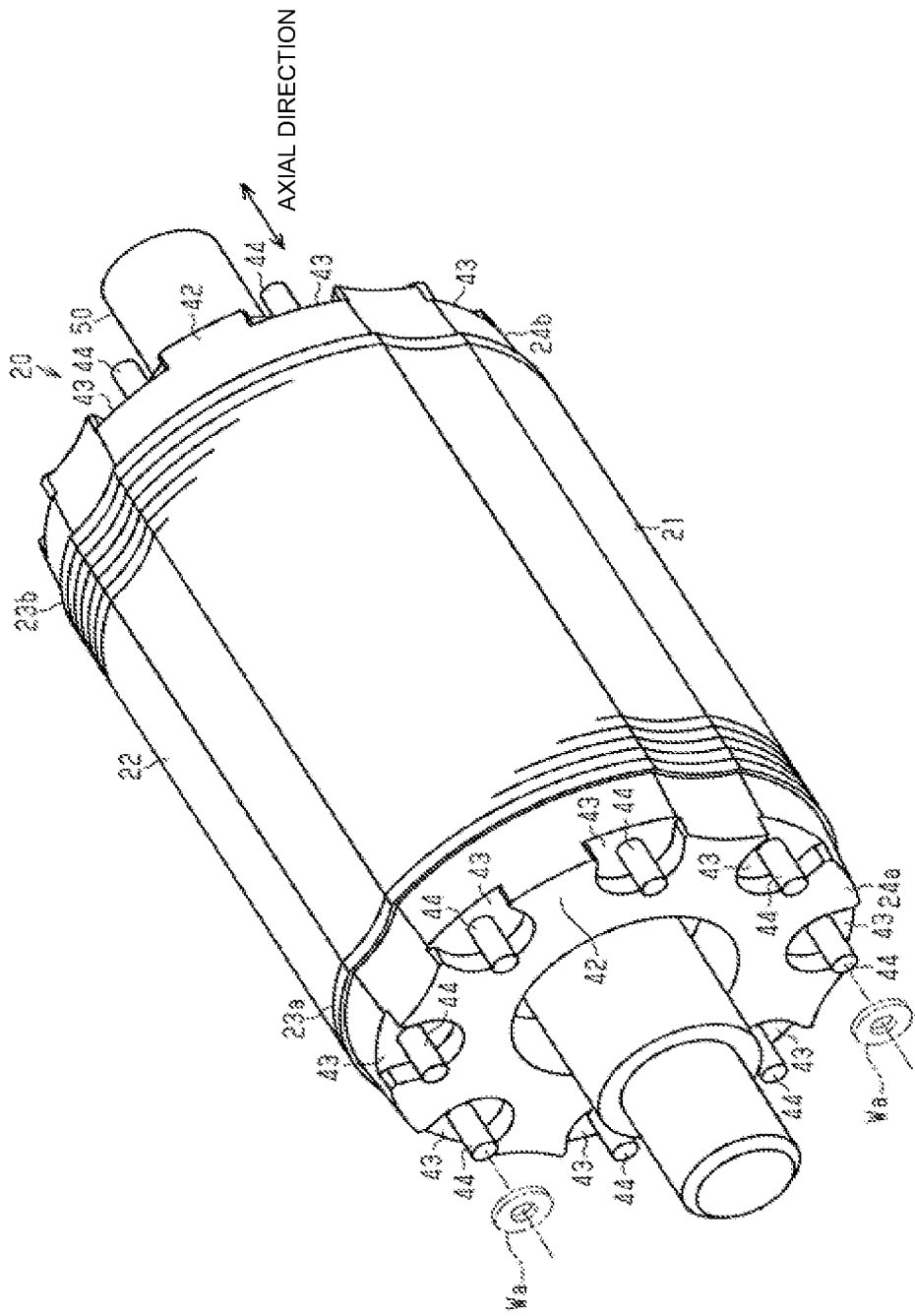
FIG. 9 is a perspective view of a rotor and a shaft of the rotating electrical machine according to the second embodiment.
Figure 10:
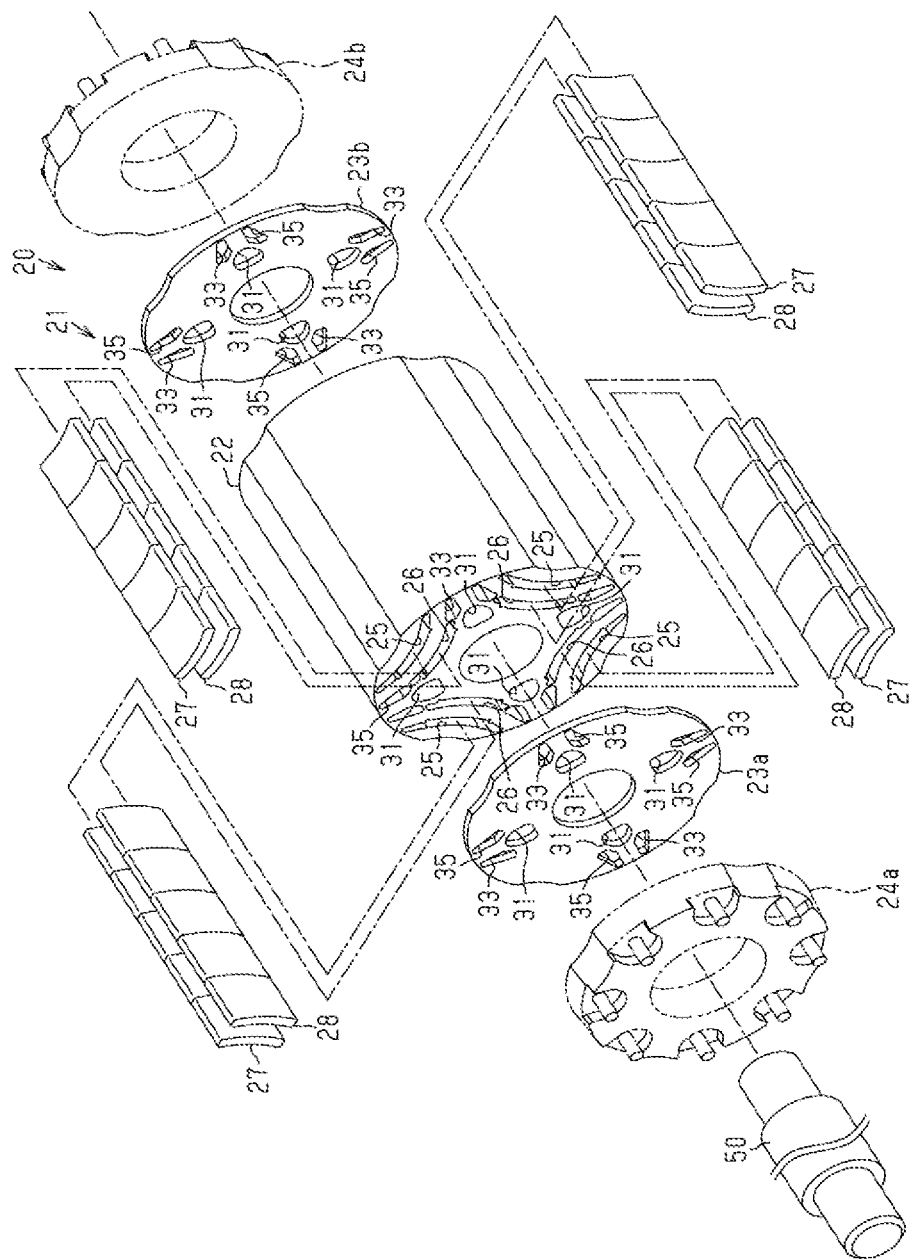
FIG. 10 is an exploded perspective view of the rotor and the shaft according to the second embodiment.

The rotor 20 is disposed radially inside of the stator 100 and includes the cylindrical rotor core 21 formed of the stack of the plurality of electromagnetic steel plates 22 (e.g. dozens of plates) having a substantially disc shape. The electromagnetic steel plates 22 have the identical configurations. In the rotor 20 illustrated in FIG. 14, the stacked shape of the electromagnetic steel plates 22 is partially omitted. The electromagnetic steel plates 22 are coupled to the rotor core 21 by swaging using a dowel. As illustrated in FIG. 9, the rotor 20 includes covering members 23a, 23b that are respectively disposed on axially opposite ends of the stack of the electromagnetic steel plates 22 and aluminum-die-casted holding parts 24a, 24b that are respectively disposed on the covering members 23a, 23b so as to hold therebetween the stack of the electromagnetic steel plates 22.

As illustrated in FIG. 8, the rotor 20 is rotatably supported by a bearing of a housing (not illustrated), via the shaft 50, with a predetermined spacing between the outer peripheral surface of the rotor core 21 and the teeth 103. The rotor 20 is disposed such that the outer peripheral surface of the rotor core 21 faces the inner peripheral portion of the stator 100 with the gap therebetween.

Figure 11:
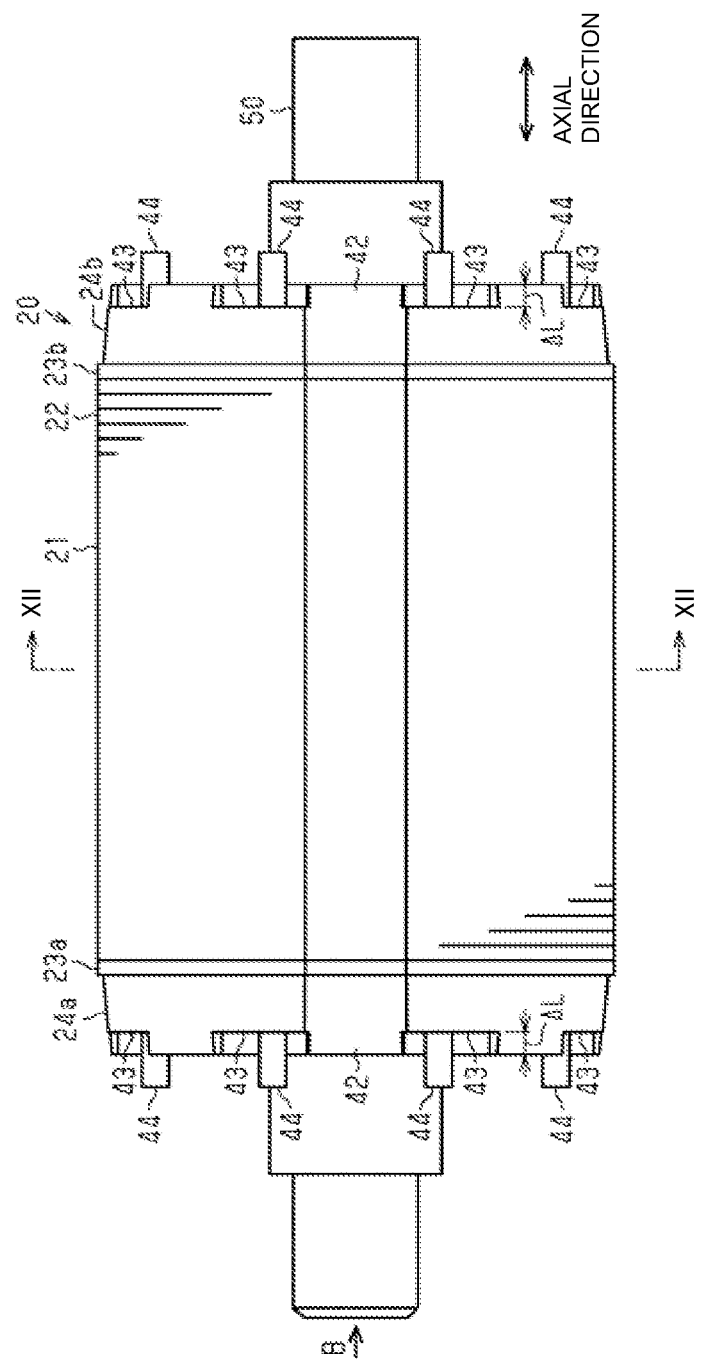
FIG. 11 is a front view of the rotor and the shaft according to the second embodiment.
Figure 12:
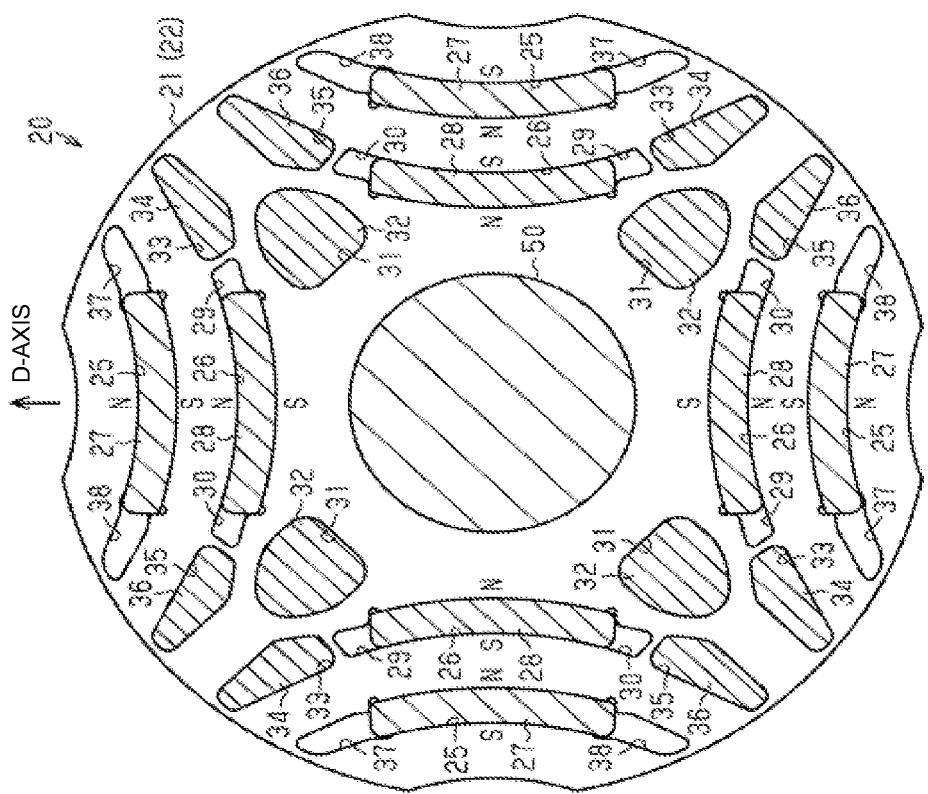
FIG. 12 is a sectional view taken along line XII-XII in FIG. 11.
Figure 14:
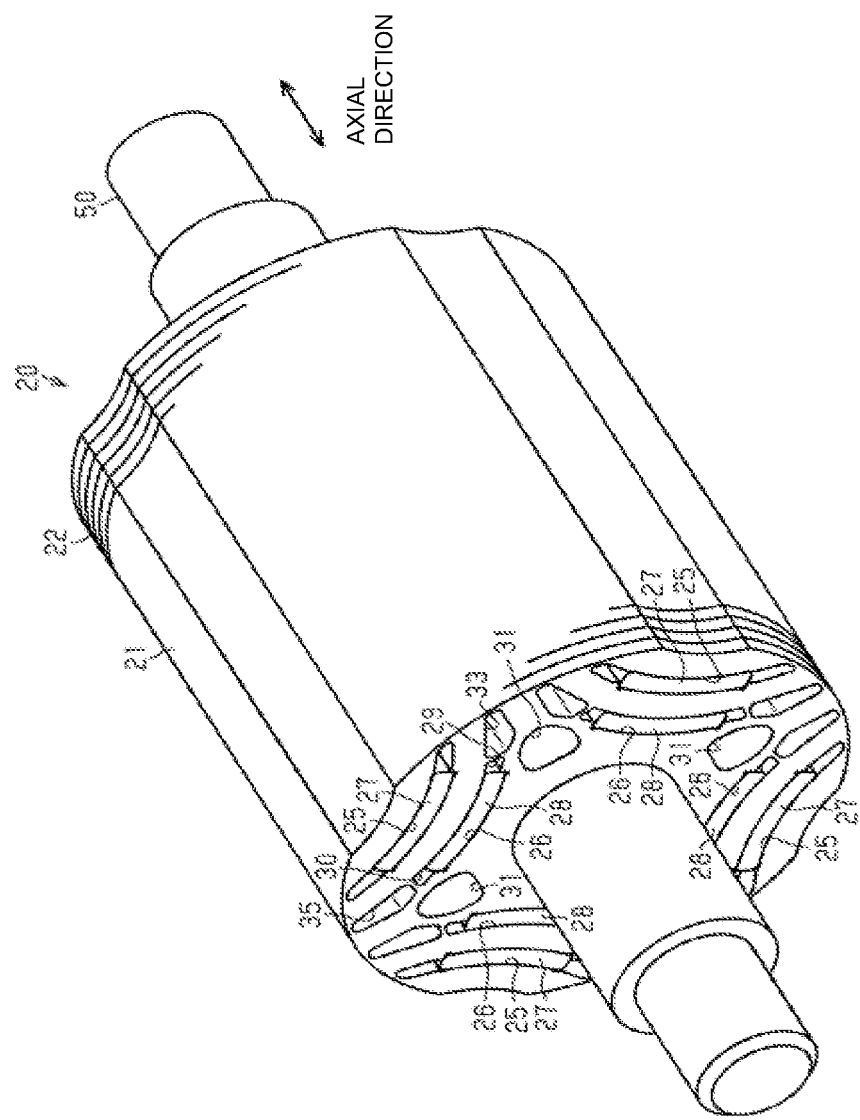
FIG. 14 is a perspective view of the rotor core and the shaft without a holding part and a covering member, according to the second embodiment.

As illustrated in FIGS. 9, 11, 14, the shaft 50 is inserted through the center of the rotor core 21 formed of the stack of the electromagnetic steel plates 22. The rotor core 21 and the shaft 50 are fixed by means, such as shrink-fitting or press-fitting. As illustrated in FIG. 12, the rotor core 21 has a plurality of outer-side permanent magnet insertion holes 25, a plurality of inner-side permanent magnet insertion holes 26, flux barriers 29, 30, 37, 38, and die cast holes 31, 33, 35.

Figure 15:
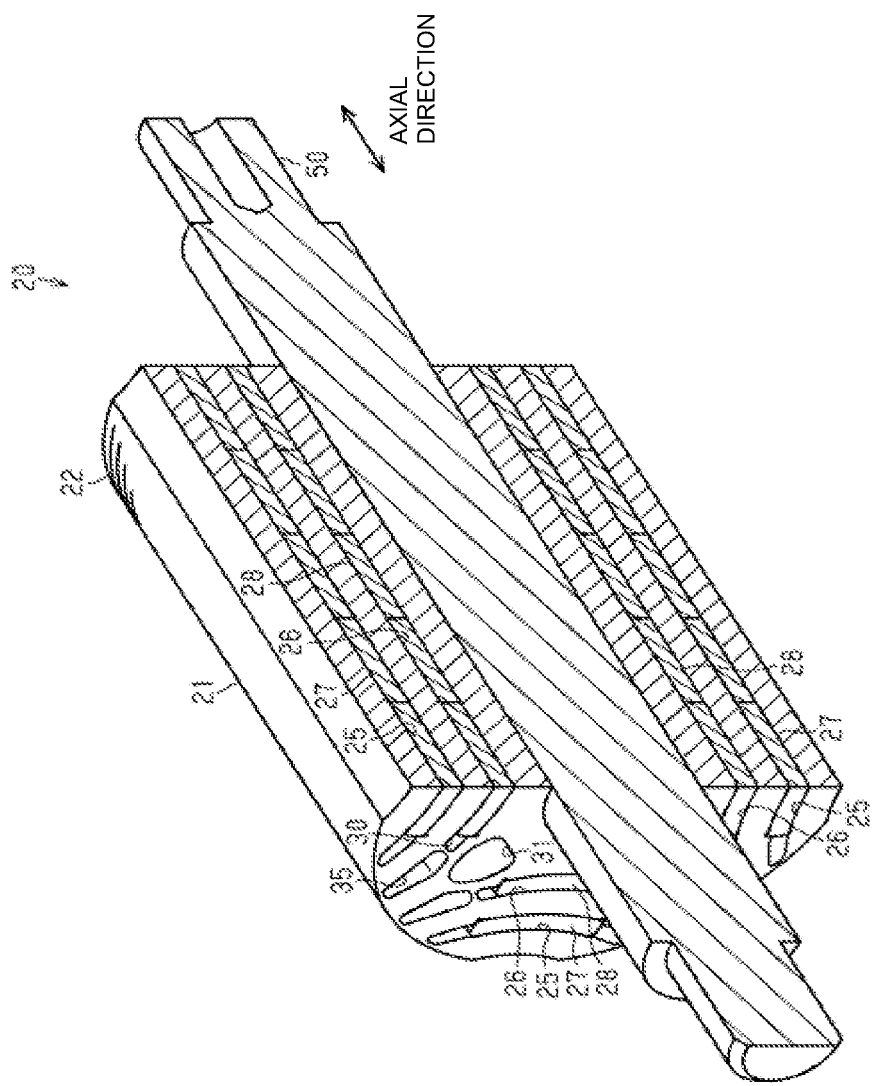
FIG. 15 is a perspective longitudinal sectional view of the rotor core and the shaft without the holding part and the covering member, according to the second embodiment.

As illustrated in FIGS. 12, 14, 15, the rotor core 21 has, in each magnetic pole, the axially extending outer-side permanent magnet insertion holes 25 located in the radially outer portion thereof and the axially extending inner-side permanent magnet insertion holes 26 located in the radially inner portion thereof with respect to the outer-side permanent magnet insertion holes 25. The outer-side permanent magnet insertion holes 25 and the inner-side permanent magnet insertion holes 26 in each magnetic pole have an arc shape. Specifically, as illustrated in FIG. 12, each of outer-side permanent magnet insertion holes 25 and the inner-side permanent magnet insertion holes 26 has an arc shape projecting toward the center of the rotor core 21 (an arc shape that has the center on the outer diameter of the rotor core 21).

Figure 13:
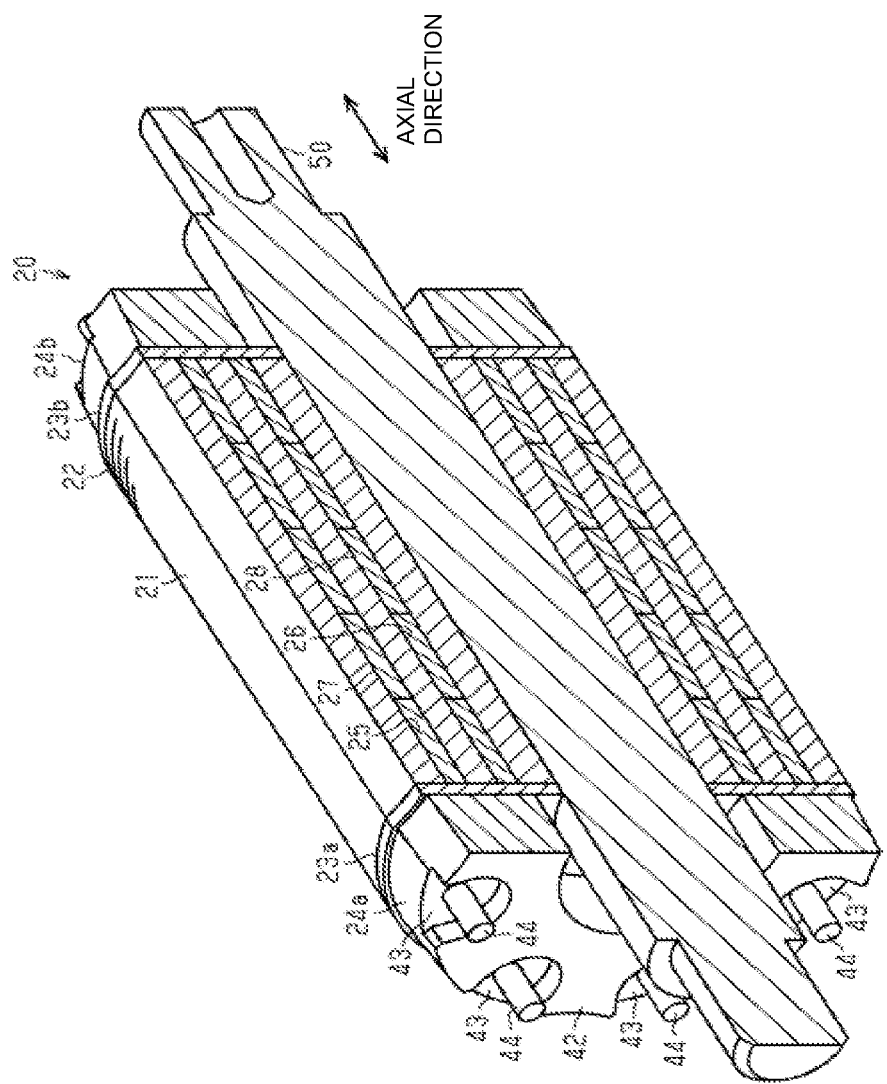
FIG. 13 is a perspective longitudinal sectional view of the rotor and the shaft according to the second embodiment.

As illustrated in FIG. 13, outer-side permanent magnets 27 are respectively inserted into the outer-side permanent magnet insertion holes 25, and inner-side permanent magnets 28 are respectively inserted into the inner-side permanent magnet insertion holes 26. Each of the outer-side permanent magnets 27 is adhered to the corresponding outer-side permanent magnet insertion hole 25. Each of the inner-side permanent magnets 28 is adhered to the corresponding inner-side permanent magnet insertion hole 26.

As illustrated in FIG. 13, the outer-side permanent magnet 27 is divided in the axial direction. The inner-side permanent magnet 28 is divided in the axial direction. Using the axially divided permanent magnet helps the loss reduction and the improvement of economic efficiency.

As illustrated in FIG. 12, the inserted permanent magnets 27, 28 have an arc shape. At each magnetic pole, the outer-side permanent magnet 27 is located on the d-axis and magnetized in its thickness direction. At each magnetic pole, the inner-side permanent magnet 28 is located on the d-axis and magnetized in its thickness direction. The outer-side permanent magnets 27 and the inner-side permanent magnets 28 are arranged in magnetic pole regions such that adjacent magnetic pole regions (one pole) have different polarities in the radially outer portion of the rotor 20. For example, if one of the outer-side permanent magnets 27 is arranged in a magnetic pole region such that the polarity adjacent to the teeth 103 is the south pole, another one of the outer-side permanent magnets 27 is arranged in the next magnetic pole region such that the polarity adjacent to the teeth 103 is the north pole.

As illustrated in FIGS. 12, 14, a flux barrier 29 is formed circumferentially adjacent to and continuously with one end of the inner-side permanent magnet insertion hole 26 of the rotor core 21. Furthermore, a flux barrier 30 is formed circumferentially adjacent to and continuously with the other end of the inner-side permanent magnet insertion hole 26 of the rotor core 21. The flux barriers 29, 30 have an arc shape. A flux barrier 37 is formed circumferentially adjacent to and continuously with one end of the outer-side permanent magnet insertion hole 25 of the rotor core 21. Furthermore, a flux barrier 38 is formed circumferentially adjacent to and continuously with the other end of the outer-side permanent magnet insertion hole 25 of the rotor core 21. The flux barriers 37, 38 have an arc shape.

Figure 16:
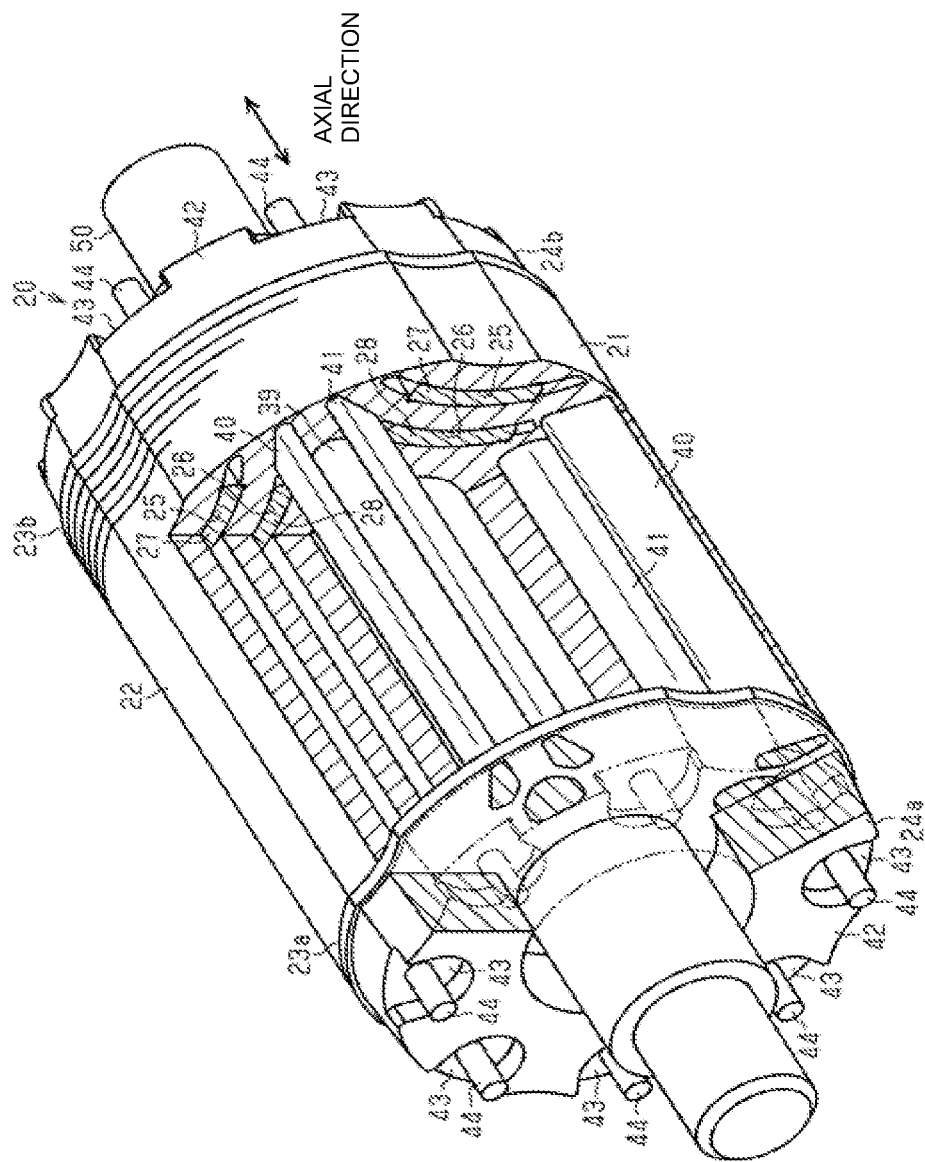
FIG. 16 is a partially broken perspective view of the rotor and the shaft according to the second embodiment (a partially broken view of FIG. 9).
Figure 17:
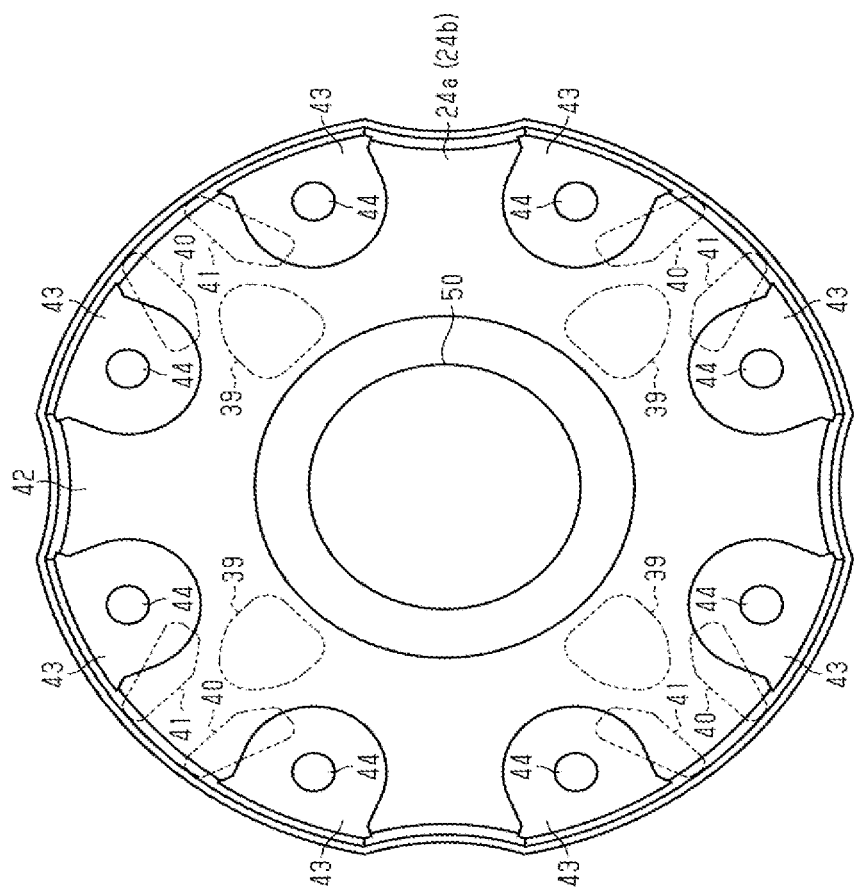
FIG. 17 is a side view of the rotor and the shaft according to the second embodiment (as viewed in the direction B in FIG. 11).
Figure 18:
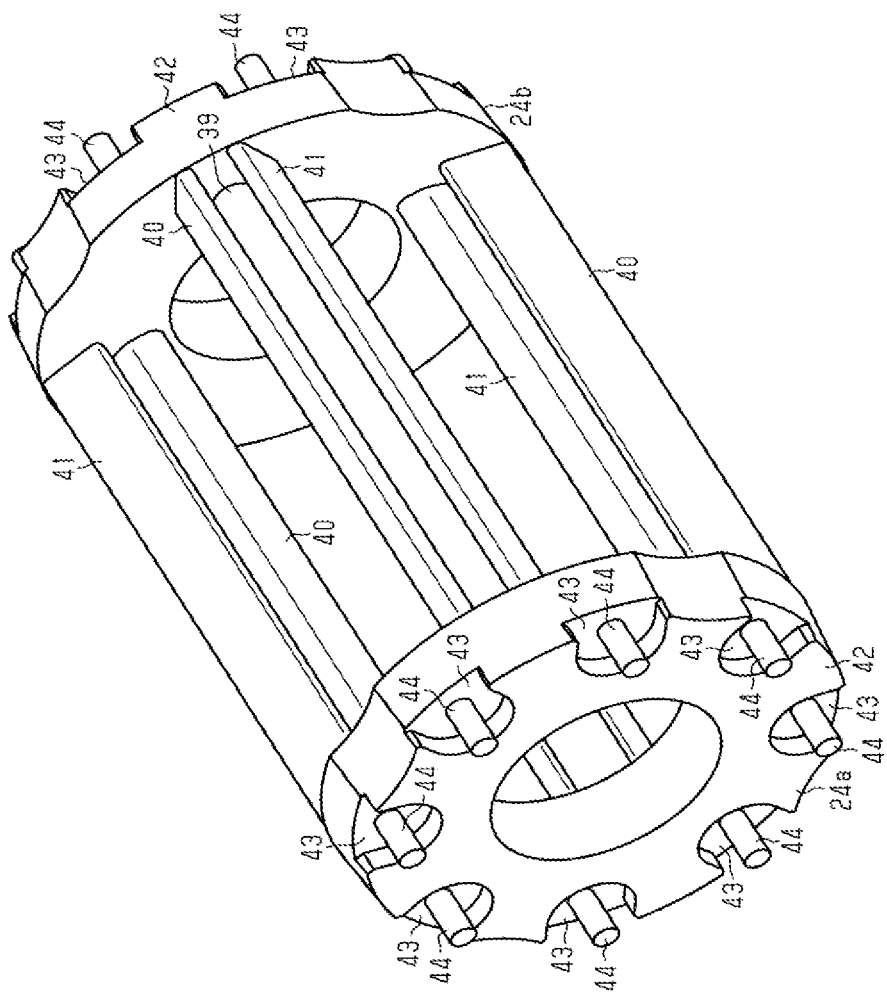
FIG. 18 is a perspective view of a product provided by aluminum-die casting in FIG. 9.

In the rotor core 21, each of the die cast holes 31, which serves as a fill hole extending in the axial direction of the rotor core 21, is formed in a region between the flux barriers 29, 30 respectively in the adjacent magnetic poles. The die cast hole 31 is filled with pure aluminum 32 that serves as non-magnetic metal. The electromagnetic steel plates 22 are fixed by the pure aluminum 32 filled in the die cast hole 31. The pure aluminum 32 to be filled in the die cast hole 31 is filled by die casting from a state illustrated in FIGS. 14, 15 to a state in FIGS. 11-13. As illustrated in FIGS. 16-18, a bar 39 is formed of the pure aluminum 32 filled in the die cast hole 31.

In each of the magnetic poles of the rotor core 21, the die cast hole 33, which serves as a fill hole extending in the axial direction of the rotor core 21, is formed circumferentially away from the corresponding flux barrier 29. Furthermore, in each of the magnetic poles of the rotor core 21, the die cast hole 35, which serves as a fill hole extending in the axial direction of the rotor core 21, is formed circumferentially away from the corresponding flux barrier 30. The die cast hole 33 is filled with pure aluminum 34 that serves as non-magnetic metal. The die cast hole 35 is filled with pure aluminum 36 that serves as non-magnetic metal. The electromagnetic steel plates 22 are fixed by the pure aluminum 34 and the pure aluminum 36 filled in the die cast holes 33, 35. The pure aluminum 34 and the pure aluminum 36 to be filled in the die cast holes 33, 35 are filled by die casting from a state illustrated in FIGS. 14, 15 to a state in FIGS. 11-13. As illustrated in FIGS. 16-18, a bar 40 is formed of the pure aluminum 34 filled in the die cast hole 33, and a bar 41 is formed of the pure aluminum 36 filled in the die cast hole 35.

As illustrated in FIGS. 11, 13, the rotor core 21 includes at axially opposite ends thereof the holding parts 24a, 24b. The holding parts 24a, 24b are made of the pure aluminum by die casting from a state illustrated in FIGS. 14, 15 to a state in FIGS. 11, 13. As illustrated in FIGS. 16-18, the holding parts 24a, 24b made of pure aluminum are formed integrally with axially opposite end surfaces of the rotor core 21, respectively, and the holding parts 24a, 24b are made by die casting from a state illustrated in FIGS. 14, 15 to a state in FIGS. 11, 13.

As illustrated in FIGS. 16-18, each of the holding parts 24a, 24b has a thick wall portion 42 connected to the bar 39 made of the pure aluminum 32 filled in the die cast hole 31, and a thin wall portion 43 that is arranged at multiple positions in the circumferential direction. As illustrated in FIG. 17, the thin wall portion 43 is formed at eight positions circumferentially separated from each other by 45 degrees. Each thin wall portion 43 is formed by the bottom surface of a semi-circular cutout that opens at the outer peripheral portion of each of the holding parts 24a, 24b. A pin 44 for rotational balancing is formed integrally with each of the thin wall portions 43 at the center thereof such that the pin 44 protrudes outwardly from each of the thin wall portions 43 in the axial direction. The pin 44 has a solid cylindrical shape. The pin 44 is provided with a ring-shaped washer Wa having a required thickness as a balance weight (see FIG. 9), and the washer Wa is fixed by pressing a portion of the pin 44 protruding out of the washer Wa.

The number of pins 44 (thin wall portions 43) may be determined as necessary in consideration of the relationship between the poles and the pins 44, such as eight pins for four poles, or 12 pins for four poles.

As illustrated in FIGS. 9, 10, 11, 13, the rotor core 21 includes the electromagnetic steel plates 22 having the permanent magnet insertion holes 25, 26 and the die cast holes 31, 33, 35, and further includes a covering member 23a between the holding part 24a and its adjacent electromagnetic steel plate 22 and a covering member 23b between the holding part 24b and its adjacent electromagnetic steel plate 22, and the covering members 23a, 23b each have the die cast holes 31, 33, 35 but do not have the outer-side permanent magnet insertion holes 25 and the inner-side permanent magnet insertion hole 26. The covering members 23a, 23b have the same shape as the shape of each electromagnetic steel plate 22. The die cast holes 31, 33, 35 are filled with aluminum by die casting from a state illustrated in FIGS. 14, 15 to a state in FIGS. 11-13.

The following describes an operation of the thus configured rotating electrical machine 10 according to the second embodiment.

When the rotating electrical machine is driven, a current is supplied to the coil 104 of the stator 100, so that a rotating magnetic field is generated in the stator 100 to act on the rotor 20. The magnetic attractive force and repulsive force between the rotating magnetic field and the permanent magnets 27, 28 then cause the rotor 20 to rotate synchronously with the rotating magnetic field.

In the rotor core 21, each of the die cast holes 31 extends axially and is formed in a region between the flux barriers 29, 30 respectively in the adjacent magnetic poles, and the electromagnetic steel plates 22 are fixed by the pure aluminum 32 filled in the die cast holes 31. This configuration enables firm fixing of the electromagnetic steel plates 22 of the rotor core 21, thereby suppressing a warp in the electromagnetic steel plates 22 of the rotor core 21. That is, in a sectional view of the rotor having an arc shape and including magnets in two layers, a die cast hole is formed in a region that is located between flux batters and is not affected by shrink-fitting force, so that both of the performance and strength of the rotor are enhanced.

The connection between each of the holding parts 24a, 24b and the bar 39 made of the pure aluminum 32 filled in the die cast hole 31 is reinforced at the thick wall portion 42, so that the electromagnetic steel plates 22 are firmly fixed. The pin 44 for rotational balancing is formed such that the pin 44 protrudes outwardly from each of the thin wall portions 43 of the holding parts 24a, 24b in the axial direction, so that rotational balancing is facilitated. The thick wall portion 42 of each of the holding parts 24a, 24b made of pure aluminum is connected to the bar 39 made of the pure aluminum 32 filled in the die cast hole 31, so that connection strength of the bar 39 made of pure aluminum is enhanced. The pin 44 for rotational balancing is formed such that the pin 44 protrudes outwardly from each of the thin wall portions 43 of the holding parts 24a, 24b in the axial direction, so that the rotation of the rotor is balanced.

This will be described in more detail.

The length of the inner-side permanent magnet insertion hole is likely to increase, so that the performance and the strength cannot be balanced. Specifically, the electromagnetic steel plate is likely to peel due to a centrifugal force, so that the thin bridge is subjected to bending stress, which decreases the strength markedly. In this case, if a thick non-magnetic plate is added to the rotor end so as to increase the strength of the rotor core, the manufacturing cost is increased. More specifically, when the permanent magnets are arranged so as to form two layers on the outer side and inner side, inner stress is generated by shrink-fitting of the shaft, which causes a warp in the rotor core in a direction perpendicular to the cross section, and a fixing force between the rotor core and the shaft therefore decreases. However, the addition of a rigid plate to the rotor end for reduction of the warp increases the manufacturing cost of adopting the rigid plate and fixtures (screw, swage, etc.).

According to the second embodiment, die-casting technology and equipment are used in a case where equipment for manufacturing an induction motor is available. In a case where equipment for manufacturing the induction motor is already installed, adoption of die-cast fixtures minimizes new equipment investment, thereby providing a rotor structure at low cost. The adoption of die-casting fixtures eliminates the need for rigid plate and its fixing, thereby reducing the parts cost.

General aluminum die-cast uses a material with high strength, such as ADC 12, however, the rotor according to the embodiments uses pure aluminum, which is the same material as the material of the induction motor, so as to produce a rotor structure at low cost without causing additional cost.

It is to be noted that the arrangement of the die cast holes formed through the rotor core is important for the use of pure aluminum to increase the structural stiffness of the rotor. The rotating electrical machine according to the embodiments is a synchronous motor, however, if the die cast holes are placed at inappropriate positions, the performance of the rotating electrical machine (e.g., output performance) may be decreased by an induced current generated by an alternating magnetic field from the stator. Therefore, it requires a careful consideration of an effect when the die cast holes are formed in a portion of the rotor core adjacent to the outer periphery of the rotor core in the sectional view, and it may generate an adverse effect (e.g., a decrease in a shrink-fitting force) when the die cast holes are formed in a portion of the rotor core adjacent to the inner periphery of the rotor core in the sectional view because the shaft is fixed to the rotor core by shrink-fitting for cost reduction. That is, in the rotor for an electrical machine with permanent magnets in a rotor core, die cast holes may not be formed in a region around the permanent magnets because the region forms a flux path, and the die cast holes also may not be formed in the inner-side region of the rotor core because the shrink-fitting is performed in the inner-side region.

According to the second embodiment, the die cast holes 31 are formed in the inner-side region between the flux barriers 29, 30 respectively in the two adjacent poles, which do not prevent the q-axis magnetic flux forming a magnetic circuit of the rotor core and the strength of the inner-side portion of the rotor core in which the shaft is fixed by shrink-fitting. The die cast holes are preferably formed in a region between magnetic poles where the q-axis flux path between magnetic poles is not prevented, that is, a region of the rotor core where a magnetic flux density is not high, and a region between a left magnetic flux and a right magnetic flux branched from the q-axis magnetic flux from the outer side toward the inner side. This configuration does not prevent the q-axis magnetic flux of the rotor core and the shrink-fitting of the shaft in the inner peripheral portion of the rotor core.

Accordingly, the fixing strength of the shaft to the rotor is sufficiently improved even if the shaft is shrink-fitted into the rotor core. At the manufacturing of the rotor 20, the electromagnetic steel plates 22 are stacked on top of each other, and one of the covering members 23a is placed on one end of the stack of the electromagnetic steel plates 22. The stack is swaged after the permanent magnets 27, 28 are inserted into the stack and another one of the covering members 23b is placed, and the stack is fixed by the pure aluminum 32, the pure aluminum 34, and the pure aluminum 36 respectively filled in the die cast holes 31, 33, 35 by die casting.

Accordingly, the rotor according to the second embodiment suppresses a warp in the electromagnetic steel plates that may be caused by the shrink-fitting performed at the manufacturing or a centrifugal force generated by an increase in the rotational speed during the normal operation.

The thickness of each of the holding parts 24a, 24b is locally increased where the strength is required, and locally decreased where the strength is not required, and the holding parts 24a, 24b and the pins 44 formed where the thickness of each of the holding parts 24a, 24b is decreased are made of pure aluminum, which is equivalent to the material of the inductance motor, by die casting. Each of the holding parts 24a, 24b has the thin wall portions 43 where the thickness of each of the holding parts 24a, 24b is decreased, and the pins 44 are respectively formed in the thin wall portions 43 such that the pins 44 avoid the axially penetrating bars 39 formed by aluminum die casting. This provides a rotor structure at low cost by using equipment for manufacturing the induction motor, and enables a reduction in size of the rotor by reducing the axial length of the rotor by reduction in thickness (see ΔL in FIG. 11).

As for the positional relationship between the bars 39 formed by aluminum die casting and the thin wall portions 43, the bars 39 disposed in the die cast holes 31 are connected to the thick wall portions 42 of the holding parts 24a, 24b to firmly fix the rotor core 21 since the arrangement of the die cast holes needs to be optimized in terms of strength and performance.

The holding parts 24a, 24b function as a reinforcing portion for suppressing a warp in the rotor core and function as a rotation balancer of the rotor. Since the die cast structure of the rotor is made of pure aluminum so as to use an existing manufacturing line for an inductance motor, the rotation of the rotor is balanced at low cost by means of swaging the washers Wa on the pins 44 formed in the holding parts 24a, 24b.

At the fast rotation of the rotor, hoop stress is distributed over the holding parts 24a, 24b, and is centered on the connections, particularly on the inner-side corners of the connections, between the holding parts 24a, 24b and the bars 39, so that the connection needs a certain thickness for securing the strength so as to release the stress. Since the covering members 23a, 23b disposed at the connections between the holding parts 24a, 24b and the bars 39 do not have permanent magnet insertion holes, the strength of the covering members 23a, 23b is higher than that of electromagnetic steel plates having permanent magnet insertion holes. The covering members 23a, 23b formed of electromagnetic steel plates are stacked on top of each other at low cost and at the same time by a change of a blade of a press-cutting machine for the electromagnetic steel plates. This allows the connections between the holding parts 24a, 24b and the bars 39 to be reinforced by the coveting members 23a, 23b disposed at the connections. Additionally, the coveting members 23a, 23b function to prevent the pure aluminum from flowing into the permanent magnet insertion holes. Furthermore, the thickness of the holding parts 24a, 24b can be decreased at the connections to the bars 39, which allow a reduction in size of the rotor while ensuring the strength of the rotor by providing the pins 44 at the thin wall portions.

As illustrated in FIG. 17, connections of the holding parts 24a, 24b with the bars 40, 41 are partially located at the thin wall portions 43. However, the hoop stress is reduced because the bars 40, 41 are located on the outer peripheral side of the holding parts 24a, 24b than the bars 39 are, so that the strength of the rotor is satisfactory at points where the connections are located at the thin wall portions.

As such, the covering members 23a, 23b are disposed at the axially opposite ends of the rotor core 21 so as to provide the die cast strength to the ends and protect the permanent magnets from the melted aluminum. The thicknesses of the holding parts 24a, 24b are axially increased where the die cast holes 31 are formed, whereas the thicknesses of the holding parts 24a, 24b are decreased where the die cast holes 31 are not formed. The pins 44 for rotational balancing are provided at the thin wall portions 43 by pressing the portion of each pure aluminum pin 44 protruding out of the washer (washer addition). This means is less expensive than a means of making holes in a plane surface (weight reduction) for rotational balancing, and the arrangement of the pins and thin wall portions allows the rotor to include small and rigid holding parts 24a, 24b formed by die casting. Furthermore, the connections between the holding parts 24a, 24b and the bars 39 on which the stress is centered may be reinforced by using the covering members 23a, 23b with high strength (without permanent magnet insertion holes).

The second embodiment achieves the following advantages.

(1) In the rotor 20 for the rotating electrical machine 10 including the cylindrical rotor core 21 that has the outer peripheral surface facing the inner peripheral portion of the stator 100 around which the coil 104 is wound, the shaft 50 is inserted through the center of the rotor core 21 that is formed of the stack of the electromagnetic steel plates 22. The rotor core 21 has, in each magnetic pole, the axially extending outer-side permanent magnet insertion holes 25 located in the radially outer portion thereof and the axially extending inner-side permanent magnet insertion holes 26 located in the radially inner portion thereof with respect to the outer-side permanent magnet insertion holes 25. The outer-side permanent magnets 27 are respectively inserted into the outer-side permanent magnet insertion holes 25, and the inner-side permanent magnets 28 are respectively inserted into the inner-side permanent magnet insertion holes 26. The flux barriers 29, 30 are respectively formed circumferentially adjacent to and continuously with the opposite ends of each inner-side permanent magnet insertion hole 26 of the rotor core 21. In the rotor core 21, each of the die cast holes 31, which serves as a fill hole extending in the axial direction of the rotor core 21, is formed in a region between the flux barriers 29, 30 respectively in the adjacent magnetic poles, and the electromagnetic steel plates 22 are fixed by the pure aluminum 32 that serves as non-magnetic metal and is filled in the die cast holes 31.

In the rotor core 21, each of the die cast holes 31 extends axially and is formed in a region between the flux barriers 29, 30 respectively in the adjacent magnetic poles, and the electromagnetic steel plates 22 are fixed by the pure aluminum 32 filled in the die cast holes 31. This configuration enables firm fixing of the electromagnetic steel plates 22 of the rotor core 21 and suppression of a warp in the electromagnetic steel plates 22 of the rotor core 21.

(2) The rotor core 21 includes the holding parts 24a, 24b, which are made of pure aluminum that serves as non-magnetic metal, formed integrally with the axially opposite end faces of the rotor core 21. Each of the holding parts 24a, 24b has the thick wall portion 42 connected to the bars 39 made of pure aluminum filled in the die cast holes 31, and the thin wall portion 43 that is arranged at multiple positions in the circumferential direction. The pin 44 for rotational balancing is formed integrally with each thin wall portion 43 such that the pin 44 protrudes outwardly from the thin wall portion 43 in the axial direction.

Accordingly, the electromagnetic steel plates 22 are fixed by the pure aluminum 32, which is filled in each die cast hole 31 that extends axially and is located between the flux barriers 29, 30 respectively in the adjacent magnetic poles in the rotor core 21. The thick wall portion 42 of each of the holding parts 24a, 24b made of pure aluminum is connected to the bars 39 made of pure aluminum filled in the die cast holes 31, so that the connection strength of each bar 39 made of pure aluminum is enhanced. This allows the electromagnetic steel plates 22 of the rotor core 21 to be firmly fixed. The pin 44 for rotational balancing is formed integrally with each of the thin wall portions 43 of the holding parts 24a, 25a such that the pin 44 protrudes outwardly from the thin wall portion 43 in the axial direction, so that rotational balancing is facilitated by using the pin 44. Each thin wall portion 43 with the pin 44 extending axially enables a reduction in size of the rotor by reducing the axial length of the rotor by reduction from the thick wall portion 42 (see ΔL in FIG. 11).

(3) The rotor core 21 includes the electromagnetic steel plates 22 having the permanent magnet insertion holes 25, 26 and the die cast holes 31, which each serve as a fill hole, and further includes the coveting member 23a between the holding part 24a and its adjacent electromagnetic steel plate 22 and the covering member 23b between the holding part 24b and its adjacent electromagnetic steel plate 22. Since the covering members 23a, 23b each have the die cast holes only, the covering members 23a, 23b prevent the pure aluminum filled into the die cast holes from flowing into the permanent magnet insertion holes.

(4) The permanent magnet insertion hole includes the axially extending outer-side permanent magnet insertion holes 25 located in the radially outer portion of the rotor core 21, and the axially extending inner-side permanent magnet insertion holes 26 located in the radially inner portion of the rotor core 21 with respect to the outer-side permanent magnet insertion holes 25. The outer-side permanent magnets 27 are inserted into the outer-side permanent magnet insertion holes 25, and the inner-side permanent magnets 28 are inserted into the inner-side permanent magnet insertion holes 26. The flux barriers 29, 30 are respectively located circumferentially adjacent to and continuously with the opposite ends of each inner-side permanent magnet insertion hole 26 of the rotor core 21. In the rotor core 21, each of the die cast holes 31 extends axially and is formed in a region between the flux barriers 29, 30 respectively in the adjacent magnetic poles. In this case, it is appropriate.

(5) The outer-side permanent magnet insertion holes 25 and the inner-side permanent magnet insertion holes 26 in each magnetic pole have an arc shape. It is particularly useful when the outer-side permanent magnet insertion holes 25 and the inner-side permanent magnet insertion holes 26 have an arc shape.

(6) The rotor core 21 further has the die cast holes 33, 35, which are located away from the flux barriers 29, 30 in the circumferential direction of the rotor core 21 and each serve as a fill hole extending in the axial direction of the rotor core 21, in each magnetic pole, and the electromagnetic steel plates 22 are fixed by the pure aluminum 34 and the pure aluminum 36 that each serve as non-magnetic metal filled in the die cast holes 33, 35. This configuration enables more firm fixing of the electromagnetic steel plates 22 of the rotor core 21, thereby further suppressing a warp in the electromagnetic steel plates 22 of the rotor core 21.

The second embodiment is not limited to the above-mentioned configuration, and can be modified and implemented as follows. The second embodiment and the following modifications can be implemented in combination with each other within a technically consistent range.

The pure aluminum serves as non-magnetic metal, but not limited thereto. The non-magnetic metal may be metal including an aluminum alloy, such as ADC 12, or copper. Resin may be used by resin molding, instead of the non-magnetic metal.

That is, each die cast hole 31, which serves a fill hole extending in the axial direction of the rotor core 21, is a resin mold hole in which resin is filled instead of the pure aluminum 32 and is formed in a region between the flux barriers 29, 30 respectively in the adjacent magnetic poles of the rotor core 21, and the electromagnetic steel plates 22 are fixed by the resin filled in the fill hole. Furthermore, the resin mold holes are formed instead of the die cast holes 33, 35 and resin is used instead of the pure aluminum 34 and the pure aluminum 36. Each of the resin mold holes is located away from the flux barriers 29, 30 in the circumferential direction in the adjacent magnetic poles of the rotor core 21 and serves as a fill hole extending in the axial direction of the rotor core 21, and the electromagnetic steel plates 22 are fixed by the resin filled in the fill hole.

Figure 19:
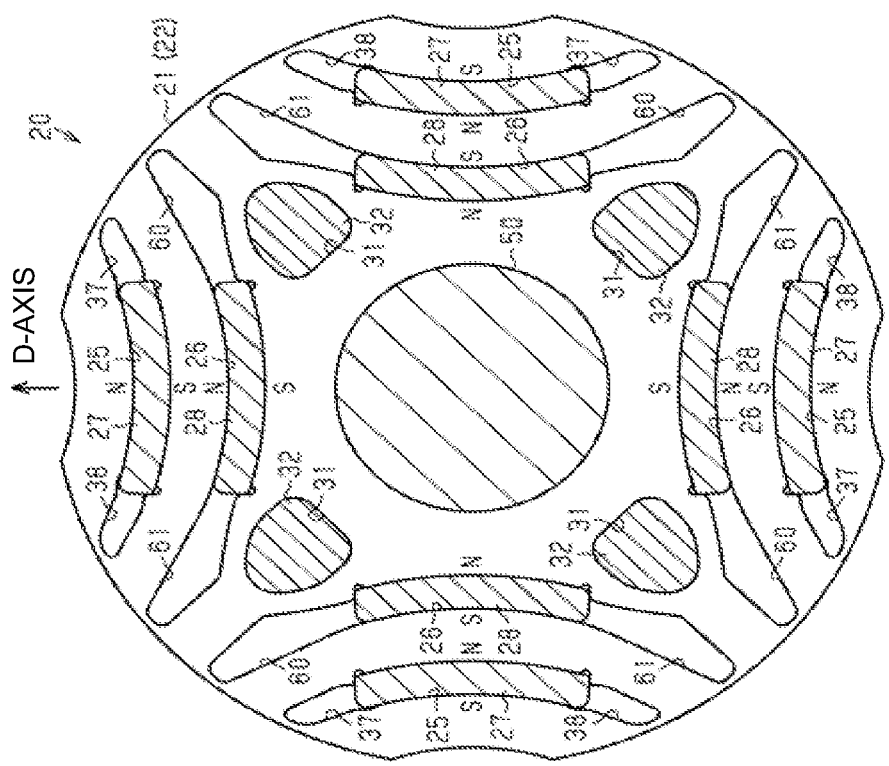
FIG. 19 is a sectional view of a rotor according to another example of the second embodiment.

The die cast holes 33, 35 are not necessarily required, and for example, flux barriers may be formed instead. More specifically, as illustrated in FIG. 19 alternative to FIG. 12, unless the strength is not decreased, flux barriers 60, 61 continuously extending from the permanent magnet insertion holes 26 may be formed instead of the die cast holes 33, 35. This enables a configuration without bridges, thereby improving the performance of the rotor. Furthermore, this configuration is provided without the bars 40, 41, and therefore enables a further extension of the thin wall portions of the holding parts 24a, 24b and a decrease in the amount of aluminum.

The number of poles is not limited to four. Any number of poles may be adopted.

The permanent magnet may have a V-shape, instead of an arc shape.

The rotor core 21 has the outer-side permanent magnet insertion holes 25 and the inner-side permanent magnet insertion holes 26 formed so as to form radially two layers, and the outer-side permanent magnets 27 and the inner-side permanent magnets 28 are respectively inserted into the outer-side permanent magnet insertion holes 25 and the inner-side permanent magnet insertion holes 26. However, the configuration of the rotor is not limited to the two-layered structure, and the permanent magnet insertion holes and the permanent magnets may be arranged so as to form a radially single layer. That is, the rotor core 21 may have a permanent magnet insertion hole extending in the axial direction of the rotor core 21 and formed in each magnetic pole, and a permanent magnet may be inserted in the permanent magnet insertion hole.

The rotor core 21 has the die cast holes 31, which each serve as a fill hole that extends in the axial direction of the rotor core 21 and is formed between the adjacent magnetic poles. However, the rotor core 21 may have a die cast hole or a resin mold hole that serves as the axially extending fill hole formed in each of the magnetic poles. For example, if the permanent magnet insertion holes and the permanent magnets are arranged so as to form a radially single layer, die cast holes or resin mold holes, which each serve as a fill hole, may be formed radially inward of the permanent magnet insertion holes and the permanent magnets.

The electrical machine does not necessarily need to be a synchronous motor, and only has to be a permanent-magnet-embedded electrical machine.

REFERENCE SIGNS LIST

10 . . . rotating electrical machine
20 . . . rotor
21 . . . rotor core
121 . . . rotor core body
22 . . . electromagnetic steel plate
72 . . . coveting portion
70, 23a, 23b . . . covering member
80, 24a, 24b . . . holding part
122 . . . permanent magnet insertion hole
90 . . . permanent magnet
25 . . . outer-side permanent magnet insertion hole
26 . . . inner-side permanent magnet insertion hole
27 . . . outer-side permanent magnet
28 . . . inner-side permanent magnet
123, 29, 30, 37, 38 . . . flux barrier
124 . . . innermost flux barrier
71 . . . cover hole
31, 33, 35 . . . die cast hole
32, 34, 36 . . . pure aluminum
39, 40, 41 . . . bar
42 . . . thick wall portion
43 . . . thin wall portion
44 . . . pin
50 . . . shaft
100 . . . stator
104 . . . coil
124a . . . outer-side closed space
124b . . . inner-side closed space
150 . . . bridge
160 . . . reinforcing part
110 . . . projecting portion
m . . . axis
C . . . imaginary inner surface
R . . . magnetic pole region
S1 . . . first inner surface
S2 . . . second inner surface

The invention claimed is:

1. A rotor for a rotating electrical machine, the rotor comprising a rotor core having a cylindrical shape and including a rotor core body, the rotor core body having a plurality of permanent magnet insertion holes which are arranged in a radial direction of the rotor core and in which a plurality of permanent magnets are inserted, wherein the rotor core has: a plurality of magnetic pole regions arranged in a circumferential direction of the rotor core; and a plurality of flux barriers adjacent to the plurality of permanent magnet insertion holes and each extending along a q-axis flux path, the flux barriers extend in an axial direction of the rotor core, the flux barriers include an innermost flux barrier that is located in a radially innermost portion of the rotor core, and the innermost flux barrier has a first inner surface and a second inner surface respectively on an inner side and an outer side in the radial direction of the rotor core, the rotor core body includes a bridge through which the first inner surface is connected to the second inner surface when the rotor core body is viewed in the axial direction of the rotor core, the innermost flux barrier has an outer-side closed space that is a defined space and is formed between the bridge and an outer periphery of the rotor core body, and the outer-side closed space is filled, in an axial direction of the rotor core body, with a reinforcing part that is made of a non-magnetic material.

2. The rotor for the rotating electrical machine according to claim 1, wherein the innermost flux barrier has an inner-side closed space that is a defined space and is formed between the bridge and the corresponding permanent magnet.

3. The rotor for the rotating electrical machine according to claim 1, wherein the rotor core includes a covering member that is stacked on each of opposite ends of the rotor core body in the axial direction of the rotor core, the covering member includes:
a cover hole communicated with the outer-side closed space; and
a covering portion covering the bridge and the permanent magnets in the respective permanent magnet insertion holes located in the radially innermost portion of the rotor core, the covering portion further covering the respective permanent magnet insertion holes located in a radially outer portion of the rotor core with respect to the permanent magnet insertion holes located in the radially innermost portion of the rotor core, and the cover hole is filled with the reinforcing part.

4. The rotor for the rotating electrical machine according to claim 1, wherein the first inner surface has a projecting portion that projects toward an adjacent one of the magnetic pole regions from an imaginary inner surface imaginarily extended along the q-axis flux path from an inner surface of the corresponding one of the permanent magnet insertion holes, wherein the inner surface of the permanent magnet insertion hole of the permanent magnet insertion hole is located radially inner side of the permanent magnet insertion hole and with which the permanent magnet comes in contact.

5. The rotor for the rotating electrical machine according to claim 1, wherein the rotor core body is formed of a plurality of electromagnetic steel plates stacked on top of each other along the axial direction of the rotor core, the rotor core includes holding parts that hold the rotor core body therebetween in the axial direction of the rotor core, and the holding parts are formed integrally with the reinforcing part.

6. A rotor for a rotating electrical machine, the rotor comprising a cylindrical rotor core that has an outer peripheral surface facing an inner peripheral portion of a stator around which a coil is wound, wherein a shaft is inserted through a center of the rotor core that is formed of a plurality of electromagnetic steel plates stacked on top of each other, the rotor core has a permanent magnet insertion hole that extends in an axial direction of the rotor core and is formed in each of magnetic poles, a permanent magnet is inserted in the permanent magnet insertion hole, and the rotor core has a fill hole that extends in the axial direction of the rotor core and is formed between the adjacent magnetic poles or in each of the magnetic poles, and the rotor core is formed of the electromagnetic steel plates fixed to each other by non-magnetic metal or resin filled in the fill hole.

7. The rotor for the rotating electrical machine according to claim 6, wherein the permanent magnet insertion hole includes an outer-side permanent magnet insertion hole located in a radially outer portion of the rotor core and an inner-side permanent magnet insertion hole located in a radially inner portion of the rotor core with respect to the outer-side permanent magnet insertion hole, the permanent magnet includes an outer-side permanent magnet inserted into the outer-side permanent magnet insertion hole and an inner-side permanent magnet inserted into the inner-side permanent magnet insertion hole, flux barriers are formed adjacent to opposite ends of the inner-side permanent magnet insertion hole of the rotor core in a circumferential direction of the rotor core and continuously with the opposite ends of the inner-side permanent magnet insertion hole, and the fill hole is formed in a region between the flux barriers respectively in the adjacent magnetic poles.

8. The rotor for the rotating electrical machine according to claim 7, wherein the outer-side permanent magnet insertion hole and the inner-side permanent magnet insertion hole in each magnetic pole have an arc shape.

9. The rotor for the rotating electrical machine according to claim 8, wherein the rotor core further has another fill hole that extends in the axial direction of the rotor core and is located away from the flux barriers in the circumferential direction of the rotor core, and the rotor core is formed of the electromagnetic steel plates fixed to each other by non-magnetic metal or resin filled in the another fill hole.

10. The rotor for the rotating electrical machine according to claim 6, wherein the rotor core includes holding parts made of the non-magnetic metal or resin and formed integrally with axially opposite end faces of the rotor core, respectively, and each of the holding parts has:
a thick wall portion that is connected to a bar made of the non-magnetic metal or resin filled in the fill hole; and
a thin wall portion that is arranged at multiple positions in a circumferential direction of the rotor core, and a pin for rotational balancing is formed integrally with the thin wall portion such that the pin protrudes outwardly from the thin wall portion in the axial direction of the rotor core.

11. The rotor for the rotating electrical machine according to claim 10, wherein the electromagnetic steel plates of the rotor core each have the permanent magnet insertion hole and the fill hole, and a covering member having the fill hole only is disposed between the holding parts and the electromagnetic steel plates.

12. The rotor for the rotating electrical machine according to claim 10, wherein
the permanent magnet insertion hole includes an outer-side permanent magnet insertion hole that extends in the axial direction of the rotor core and is located in a radially outer portion of the rotor core and an inner-side permanent magnet insertion hole that extends in the axial direction of the rotor core and is located in a radially inner portion of the rotor core with respect to the outer-side permanent magnet insertion hole,
an outer-side permanent magnet and an inner-side permanent magnet are respectively inserted into the outer-side permanent magnet insertion hole and the inner-side permanent magnet insertion hole,
flux barriers are formed adjacent to opposite ends of the inner-side permanent magnet insertion hole of the rotor core in the circumferential direction of the rotor core and continuously with the opposite ends of the inner-side permanent magnet insertion hole, and
the fill hole is formed in a region between the flux barriers respectively in the adjacent magnetic poles of the rotor core, and extends in the axial direction of the rotor core.

13. The rotor for the rotating electrical machine according to claim 12, wherein the outer-side permanent magnet insertion hole and the inner-side permanent magnet insertion hole in each magnetic pole have an arc shape.

14. The rotor for the rotating electrical machine according to claim 13, wherein the rotor core further has another fill hole that extends in the axial direction of the rotor core and is located away from the flux barriers in the circumferential direction of the rotor core, and the rotor core is formed of the electromagnetic steel plates fixed to each other by non-magnetic metal or resin filled in the another fill hole.

* * * * *